US012657528B2

(12) United States Patent
Balbuzanova

(10) Patent No.: US 12,657,528 B2
(45) Date of Patent: *Jun. 16, 2026

(54) COMPUTER-IMPLEMENTED BUDGET AND VACATION PLANNING SYSTEM AND METHOD

(71) Applicant: Veronika Balbuzanova, Loxahatchee, FL (US)

(72) Inventor: Veronika Balbuzanova, Loxahatchee, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/752,414

(22) Filed: Jun. 24, 2024

(65) Prior Publication Data

US 2024/0346391 A1 Oct. 17, 2024

Related U.S. Application Data

(63) Continuation of application No. 17/947,619, filed on Sep. 19, 2022, now Pat. No. 12,020,183.

(51) Int. Cl.
G06Q 10/02 (2012.01)
G06Q 10/40 (2026.01)

(52) U.S. Cl.
CPC ........... G06Q 10/025 (2013.01); G06Q 10/40 (2026.01); G06Q 2230/00 (2013.01)

(58) Field of Classification Search
CPC ... G06Q 10/025; G06Q 50/01; G06Q 2230/00
USPC .......................................................... 705/6
See application file for complete search history.

(56) References Cited

U.S. PATENT DOCUMENTS

| | | | |
|---|---|---|---|
| 2006/0206363 A1* | 9/2006 | Gove | G06Q 10/025 705/6 |
| 2014/0040121 A1* | 2/2014 | Robb | G06Q 20/22 705/39 |
| 2014/0046802 A1* | 2/2014 | Hosein | G06Q 30/0623 705/26.61 |
| 2014/0351351 A1* | 11/2014 | Yu | H04L 51/222 709/206 |

OTHER PUBLICATIONS

"Planning the trip itinerary for tourist groups" Published by Springer Link (Year: 2017).*

* cited by examiner

*Primary Examiner* — Zeina Elchanti
(74) *Attorney, Agent, or Firm* — Mark C. Johnson; Johnson | Dalal

(57) ABSTRACT

An Internet-based and computer-implemented system and method operated by multiple users utilizing an electronic computing device, operably configured to efficiently streamline and consolidate the event and vacation planning, selecting, deliberating, and booking process, particularly among groups of users. Beneficially, the system and method comprise instant messaging, polling, and budgeting features which aid users within a travel group in deliberating and selecting various trip accommodations, e.g., destination, lodging, transportation, excursions, etc., related to a travel event. Recommended trip accommodations are generated based on event-identifying information and a personalized user budget of a user, wherein the personalized user budget may be visually and graphically compared to a simulated user budget to assist the user in calculating the cost of a travel event, an expense category, or a trip accommodation.

14 Claims, 25 Drawing Sheets

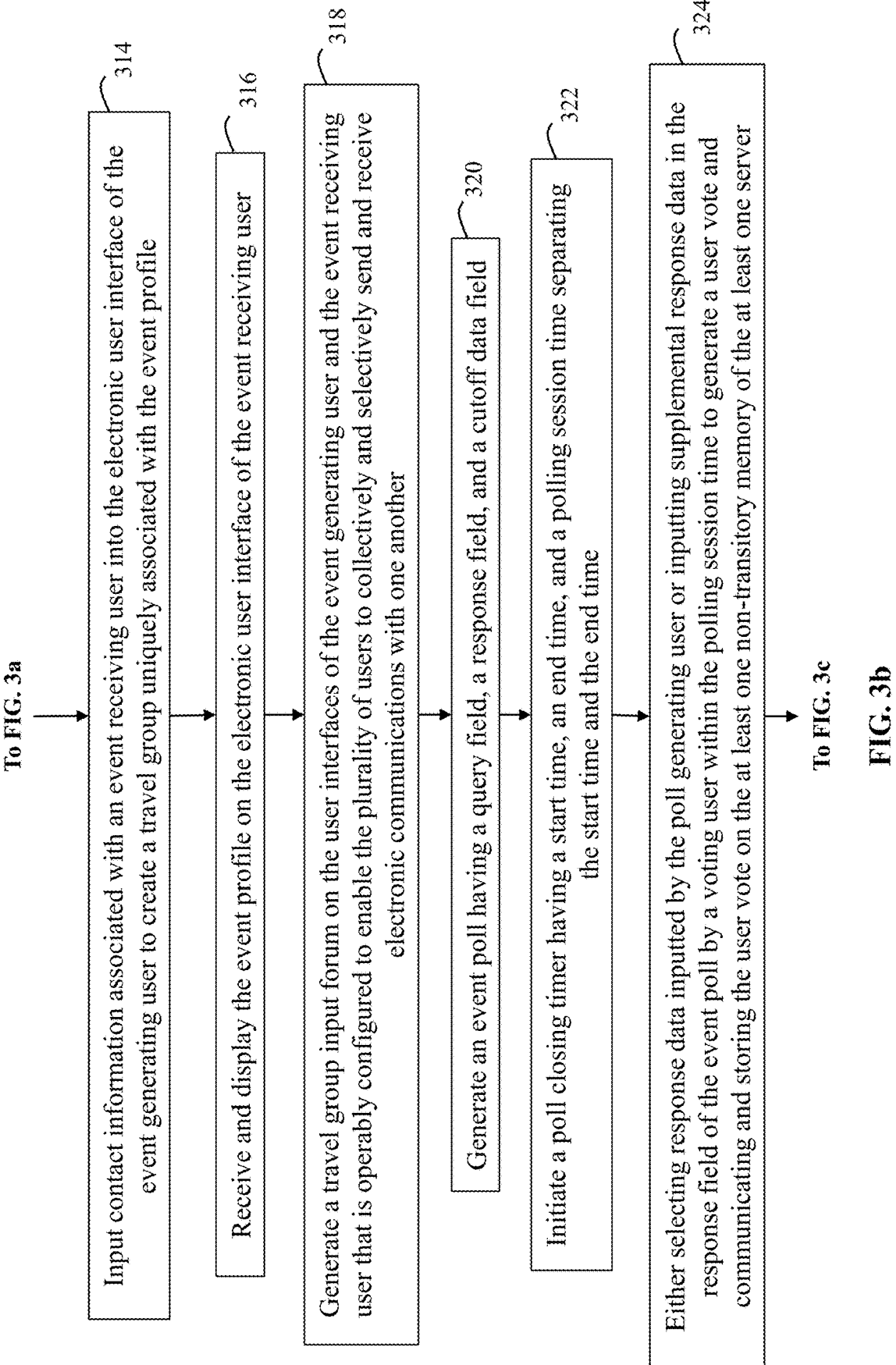

To FIG. 3a

314
Input contact information associated with an event receiving user into the electronic user interface of the event generating user to create a travel group uniquely associated with the event profile 316
Receive and display the event profile on the electronic user interface of the event receiving user 318
Generate a travel group input forum on the user interfaces of the event generating user and the event receiving user that is operably configured to enable the plurality of users to collectively and selectively send and receive electronic communications with one another 320
Generate an event poll having a query field, a response field, and a cutoff data field 322
Initiate a poll closing timer having a start time, an end time, and a polling session time separating the start time and the end time 324
Either selecting response data inputted by the poll generating user or inputting supplemental response data in the response field of the event poll by a voting user within the polling session time to generate a user vote and communicating and storing the user vote on the at least one non-transitory memory of the at least one server To FIG. 3c

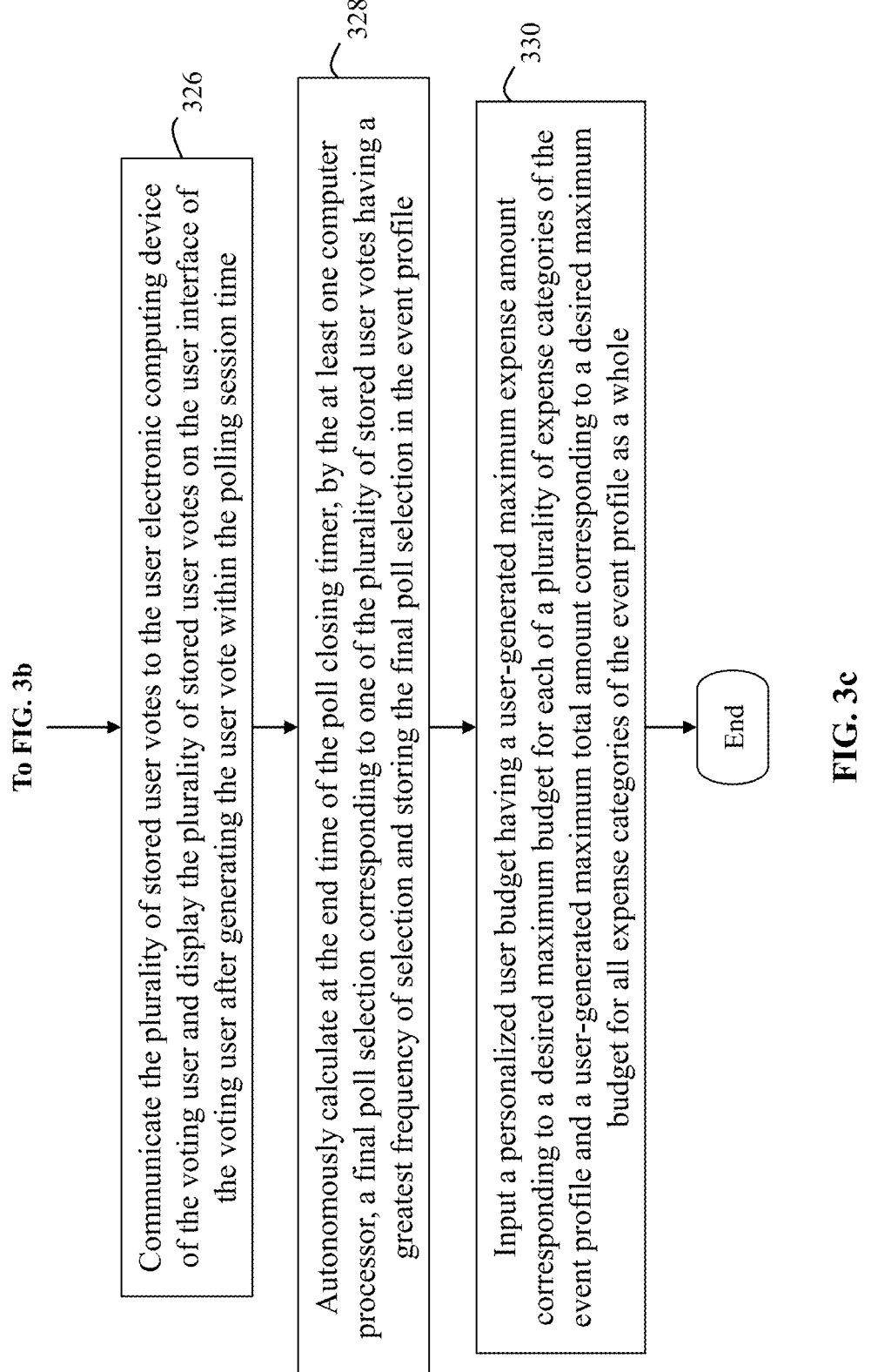

326

Communicate the plurality of stored user votes to the user electronic computing device of the voting user and display the plurality of stored user votes on the user interface of the voting user after generating the user vote within the polling session time

328

Autonomously calculate at the end time of the poll closing timer, by the at least one computer processor, a final poll selection corresponding to one of the plurality of stored user votes having a greatest frequency of selection and storing the final poll selection in the event profile

330

Input a personalized user budget having a user-generated maximum expense amount corresponding to a desired maximum budget for each of a plurality of expense categories of the event profile and a user-generated maximum total amount corresponding to a desired maximum budget for all expense categories of the event profile as a whole End

Welcome to Hilus

Provide your mobile number so we can
be able to send you confirmation code.

By signing up you agree to our Privacy Policy and Terms.

Figure 6:
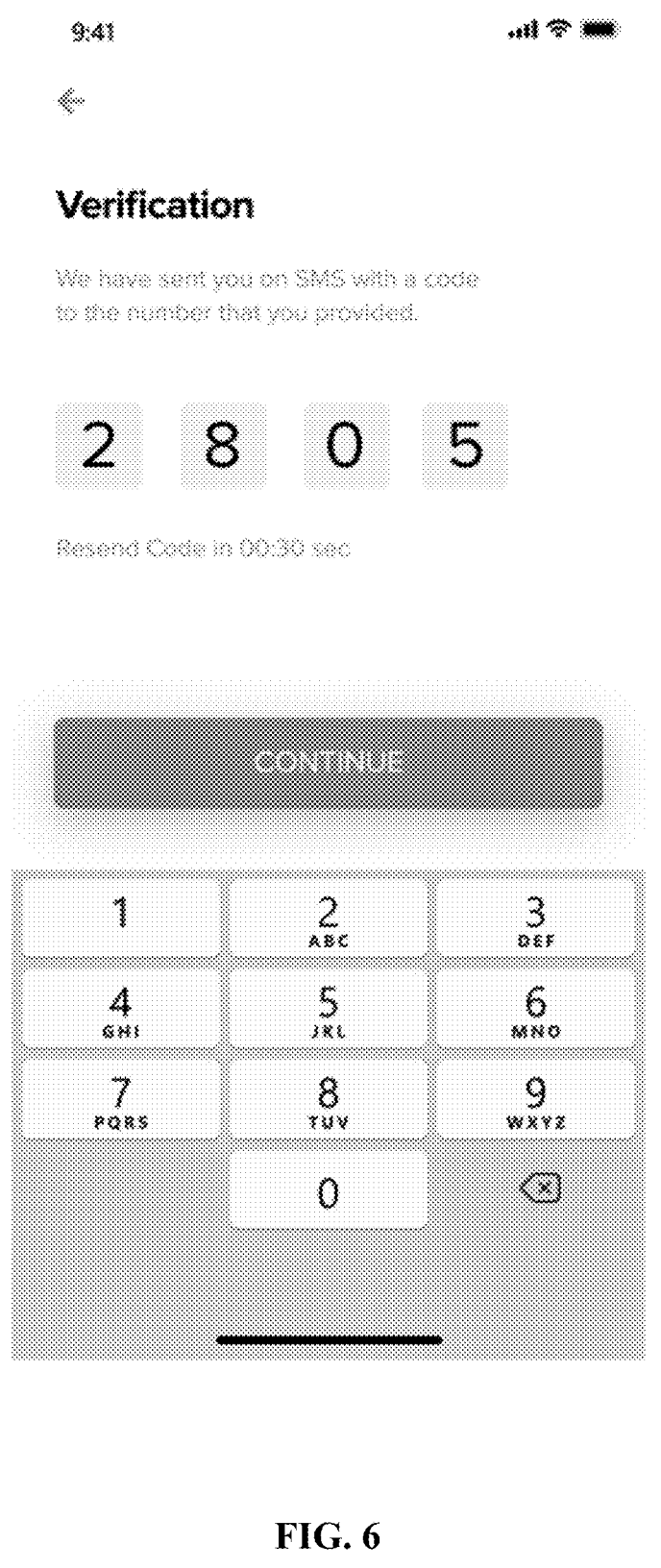

9:41    .ıl 📶 ▬

←

Verification

We have sent you on SMS with a code
to the number that you provided.

2    8    0    5

Resend Code in 00:30 sec

CONTINUE

| 1 | 2 ABC | 3 DEF |
| 4 GHI | 5 JKL | 6 MNO |
| 7 PQRS | 8 TUV | 9 WXYZ |
| | 0 | ⌫ |

Here we go !

Please provide your name and
an optional profile photo.

Kamal Kishore

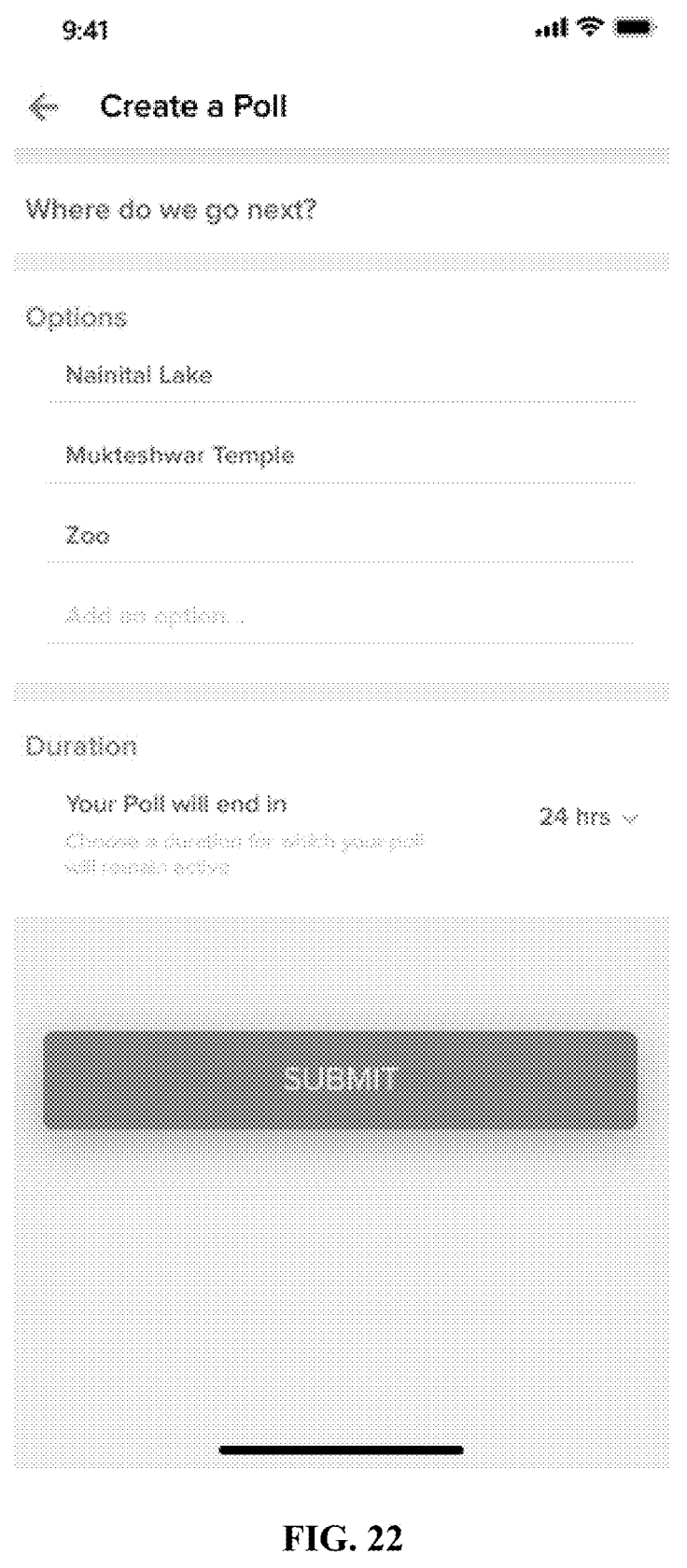

9:41

← Create a Poll

Where do we go next?

Options

Nainital Lake

Mukteshwar Temple

Zoo

Add an option...

Duration

Your Poll will end in　　　　　24 hrs ∨

Choose a duration for which your poll
　will remain active

SUBMIT

FIG. 22

COMPUTER-IMPLEMENTED BUDGET AND VACATION PLANNING SYSTEM AND METHOD

FIELD OF THE INVENTION

The present invention relates generally to computer-implemented event planning methods carried out by multiple users over a network, and, more particularly, a network-based computer-implemented budget and vacation planning system and method specifically configured to be operated by multiple users utilizing an electronic computing device.

BACKGROUND OF THE INVENTION

While a vacation, getaway, or trip abroad typically only lasts several days, the excitement, anticipation, and planning that precedes said events generally extends over a much longer duration (e.g., weeks to months). There is no doubt that the initial planning stages of a vacation can be even more exciting than the actual vacation, as users browse the wide selection of choices at their disposal (e.g., hotels, resorts, flights, cruises, vacation packages, activities, etc.), imagine the possibilities, and attempt to narrow them down to a calculated final set. Particularly where a group of users (as opposed to a single user) are involved, however, this planning and decision-making process can also be the source of much frustration, strife, and setback as members of the group struggle to find the time, medium, and opportunity to discuss the plethora of available options and narrow them down to one final set of selections (e.g., the mode of transportation, lodging, destination(s), date(s), budget, activities, and other aspects relating to the group travel event). Oftentimes, one principal group member is tasked with researching all available selections, narrowing the available selections to a reduced number of specifically tailored selections that are tailored to the general needs and desires of the group and to the type of travel event, individually communicating with each group member to obtain their individual set of selections from the tailored selections, consolidating all individual sets of selections, and finalizing and communicating the final set of selections to the group. This process not only inordinately burdens a single member of the group but is disjointed, time-consuming, and frustrating. The group travel planning process is not streamlined in a single location but requires users to continuously toggle between a number of different mobile applications, e.g., web browser, text or instant messaging application, calendar, etc.

Existing prior art fails to provide a feasible solution that adequately addresses all needs related to, and aspects of, group travel planning. See, e.g., Jolly, U.S. Pat. No. 10,397, 322 B2 (Aug. 27, 2019); Pappula, U.S. Patent Application No. 20150261813 A1 (Sep. 17, 2015); Hosier, Jr., U.S. patent application Ser. No. 20140282016A1 (Sep. 18, 2014). Users are unable to select and book their final set of selections through the mobile application directly and are unable to import the reduced number of specifically tailored selections into user-generated polls for all users within the travel group to vote on. Notably, however, the existing prior art does not generate a personalized user budget and a simulated user budget to provide the user with the convenience and ability to compare various simulated user budgets to the user's personalized user budget, aiding in the selection of the final set of selections that are ultimately chosen in accordance with the event-identifying information and the user's personalized user budget. Existing prior art also fails to generate at least one recommended final set of selections based on the personalized user budget and event-identifying information associated with the travel event, that is operably configured not to exceed the personalized user budget.

Therefore, a need exists to overcome the problems with the prior art as discussed above.

SUMMARY OF THE INVENTION

The invention provides a computer-implemented budget and vacation planning system and method that overcomes the hereinbefore-mentioned disadvantages of the heretofore-known devices and methods of this general type and that efficiently streamlines all stages of the vacation or trip planning process, with a particular emphasis on reducing the time, effort, and frustration involved in the initial selection and decision-making stages. Beneficially, the present invention provides a faster and easier way for members of a group to substantively communicate and make decisions regarding various aspects of a trip, event, or vacation, such as deciding the destination, date, lodging accommodations, mode of transportation, budget, and excursions. The polling and instant messaging features enable users to import desired selections and poll the group on the same until a final selection is reached. The final selections are imported into the event profile for convenience and users may then proceed to book their selections. Budgeting for the trip is also streamlined and made more efficient, as users are able to generate their own personalized trip budgets for both the maximum total amount users are willing to spend on the trip and the maximum amount users are willing to spend on each of a plurality of specific expense categories (e.g., lodging, transportation, activities, etc.). Specific trip accommodations may then be recommended by the present invention based on the personalized user budget and event-identifying information or selected by the user. Comparing the cost of various trip accommodations is also made easier, as a graphical user interface is generated that visually compares the personalized user budget with a simulated budget corresponding to the trip accommodations that are selected. Beneficially, this feature enables users to easily view and compare the projected cost of a plurality of recommended or selected trip accommodations to each other as well as to the personalized user budget (both the total budget and the budget for each of the plurality of expense categories).

With the foregoing and other objects in view, there is provided, in accordance with the invention, a computer-implemented process of budgeting and planning a vacation comprising the steps of: providing a plurality of user electronic computing devices, each associated with one of a plurality of users and each having an electronic user interface; providing at least one server communicatively couplable to the plurality of user electronic computing devices over a network, with at least one computer processor, and with at least one non-transitory memory storing a plurality of user accounts thereon and each associated with one of the plurality of users; communicatively coupling the plurality of user electronic computing devices with the at least one server; inputting event-identifying information into the electronic user interface of an event generating user, wherein the event generating user is one of the plurality of users; generating an event profile uniquely associated with the event-identifying information; inputting contact information associated with an event receiving user into the electronic user interface of the event generating user to create a travel group uniquely associated with the event profile, wherein the event receiving user is one of the plurality of users;

receiving and displaying the event profile on the electronic user interface of the event receiving user; generating a travel group input forum on the user interfaces of the event generating user and the event receiving user that is uniquely associated with the event profile, the travel group input forum operably configured to enable the plurality of users to collectively and selectively send and receive electronic communications with one another; generating an event poll uniquely associated with the event profile on the user interface of a poll generating user, wherein the poll generating user is one of the plurality of users and the event poll includes a query field, a response field, and a cutoff data field; initiating a poll closing timer corresponding to the poll generating user inputting query data in the query field, inputting response data in the response field, inputting cutoff data in the cutoff data field, and corresponding to the event poll communicated to the plurality of user electronic computing devices of the plurality of users in the travel group and over the network, the poll closing timer including a start time, an end time, and a polling session time separating the start time and the end time; either selecting response data inputted by the poll generating user or inputting supplemental response data in the response field of the event poll by a voting user within the polling session time to generate a user vote and communicating and storing the user vote on the at least one non-transitory memory of the at least one server, wherein the voting user is one of the plurality of users in the travel group and the user vote is one of a plurality of stored user votes; communicating the plurality of stored user votes to the user electronic computing device of the voting user and displaying the plurality of stored user votes on the user interface of the voting user after generating the user vote within the polling session time; autonomously calculating at the end time of the poll closing timer, by the at least one computer processor, a final poll selection corresponding to one of the plurality of stored user votes having a greatest frequency of selection and storing the final poll selection in the event profile; and inputting, by each of the plurality of users in the travel group and in the user interface, a personalized user budget associated with the event profile and having a user-generated maximum expense amount corresponding to a desired maximum budget for each of a plurality of expense categories of the event profile; and a user-generated maximum total amount corresponding to a desired maximum budget for all expense categories of the event profile as a whole.

In accordance with another feature, an embodiment of the present invention further comprises displaying a list of trip accommodations on the user interface.

In accordance with a further feature of the present invention, the process comprises recommending at least one trip accommodation from the list of trip accommodations on the user interface to the plurality of users in the travel group, the recommended trip accommodation operably configured not to exceed at least one of the user-generated maximum expense amount or the user-generated maximum total amount of each of the plurality of users.

In accordance with a further feature of the present invention, the process also includes selecting and booking at least one trip accommodation from the list of trip accommodations in connection with the event profile.

In accordance with another feature, an embodiment of the present invention also includes generating, in a graphical user interface on the electronic user interface, a countdown meter displaying the time remaining in the polling session time until the end time.

In accordance with a further feature, the process includes generating, in a graphical user interface on the electronic user interface, a voter meter identifying the plurality of users in the travel group who have not submitted a user vote.

In accordance with yet another feature, the process further comprises selecting and inputting, by each of the plurality of voting users in the travel group and in the user interface, at least one trip accommodation from the list of trip accommodations as supplemental response data in the response field of the event poll within the polling session time.

In accordance with a further feature, the process includes notifying the plurality of voting users within the travel group who have submitted their user vote to the event poll that a user vote comprising supplemental response data has been generated; and prompting the plurality of voting users within the travel group who have submitted their user vote to the event poll to confirm their user vote or to modify their user vote to the supplemental response data generated.

In accordance with another feature of the present invention, the process also comprises calculating and generating a simulated user budget associated with the event profile, having a projected maximum expense amount for at least one of the plurality of expense categories corresponding to the at least one trip accommodation from the list of trip accommodations and the event-identifying information.

In accordance with another feature, an embodiment of the present invention includes generating, in a graphical user interface on the electronic user interface, a visual comparison of a plurality of simulated user budgets associated with the event profile, each simulated user budget having the projected maximum expense amount for at least one of the plurality of expense categories corresponding to the at least one trip accommodation from the list of trip accommodations or the event-identifying information.

In accordance with a further feature, the process comprises generating, in a graphical user interface on the electronic user interface, a visual comparison of the simulated user budget and the personalized user budget associated with the event profile.

In accordance with the present invention, a budget and vacation planning software application operably configured to be downloaded on a plurality of user electronic computing devices each of a plurality of users, respectively, and comprising computer-readable instructions programed to: receive, by the plurality of users, user-identifying information of each of the plurality of user electronic computing devices, to create a user profile uniquely associated with the user-identifying information; receive, by an event generating user, event-identifying information generating an event profile uniquely associated with the event-identifying information and contact information associated with an event receiving user into the electronic user interface of the event generating user to create a travel group uniquely associated with the event profile, wherein the event receiving user is one of the plurality of users; receive and display the event profile on the electronic user interface of the event receiving user; generate a travel group input forum on the user interfaces of the event generating user and the event receiving user that is uniquely associated with the event profile, the travel group input forum operably configured to enable the plurality of users to collectively and selectively send and receive electronic communications with one another; generate an event poll uniquely associated with the event profile on the user interface of a poll generating user, wherein the poll generating user is one of the plurality of users and the event poll includes a query field, a response field, and a cutoff data field; initiate a poll closing timer corresponding to the poll generating user inputting query data in the query field, inputting response data in the response field, inputting cutoff data in the cutoff data field, and corresponding to the event poll communicated to the plurality of user electronic computing devices of the plurality of users in the travel group and over the network, the poll closing timer including a start time, an end time, and a polling session time separating the start time and the end time; receive, by the plurality of users, a user vote comprising at least one of the response data inputted by the poll generating user or supplemental response data inputted by a voting user within the polling session time; communicate and store the user vote on the at least one non-transitory memory of the at least one server, wherein the voting user is one of the plurality of users in the travel group and the user vote is one of a plurality of stored user votes; communicate the plurality of stored user votes to the user electronic computing device of the voting user and display the plurality of stored user votes on the user interface of the voting user after generating the user vote within the polling session time; autonomously calculate at the end time of the poll closing timer, by the at least one computer processor, a final poll selection corresponding to one of the plurality of stored user votes having a greatest frequency of selection and store the final poll selection in the event profile; and receive, by each of the plurality of users in the travel group and in the user interface, a personalized user budget associated with the event profile and having a user-generated maximum expense amount, corresponding to a desired maximum budget for each of a plurality of expense categories of the event profile, and a user-generated maximum total amount corresponding to a desired maximum budget for all expense categories of the event profile as a whole.

In accordance with another feature, the budget and vacation planning software application includes computer-readable instructions programed to book at least one trip accommodation from a list of trip accommodations on the user interface in connection with the event profile.

In accordance with another feature, an embodiment of the present invention also includes computer-readable instructions programed to notify the plurality of voting users within the travel group who have submitted their user vote to the event poll that a user vote comprising supplemental response data has been generated; and enable the plurality of voting users within the travel group who have submitted their user vote to the event poll to modify their user vote to the supplemental response data generated.

In accordance with the present invention, at least one user electronic computing device with an executable budget and vacation planning software application resident thereon and operably configured to execute computer-readable instructions programed to: receive, by the plurality of users, user-identifying information of each of the plurality of user electronic computing devices, to create a user profile uniquely associated with the user-identifying information; receive, by an event generating user, event-identifying information generating an event profile uniquely associated with the event-identifying information and contact information associated with an event receiving user into the electronic user interface of the event generating user to create a travel group uniquely associated with the event profile, wherein the event receiving user is one of the plurality of users; generate an event poll uniquely associated with the event profile on the user interface of a poll generating user, wherein the poll generating user is one of the plurality of users and the event poll includes a query field, a response field, and a cutoff data field; initiate a poll closing timer corresponding to the poll generating user inputting query data in the query field, inputting response data in the response field, inputting cutoff data in the cutoff data field, and corresponding to the event poll communicated to the plurality of user electronic computing devices of the plurality of users in the travel group and over the network, the poll closing timer including a start time, an end time, and a polling session time separating the start time and the end time; receive, by the plurality of users, a user vote comprising at least one of the response data inputted by the poll generating user or supplemental response data inputted by a voting user within the polling session time; communicate and store the user vote on the at least one non-transitory memory of the at least one server, wherein the voting user is one of the plurality of users in the travel group and the user vote is one of a plurality of stored user votes; communicate the plurality of stored user votes to the user electronic computing device of the voting user and display the plurality of stored user votes on the user interface of the voting user after generating the user vote within the polling session time; autonomously calculate at the end time of the poll closing timer, by the at least one computer processor, a final poll selection corresponding to one of the plurality of stored user votes having a greatest frequency of selection and store the final poll selection in the event profile; and receive, by each of the plurality of users in the travel group and in the user interface, a personalized user budget associated with the event profile and having at least one of a user-generated maximum expense amount, corresponding to a desired maximum budget for each of a plurality of expense categories of the event profile, or a user-generated maximum total amount corresponding to a desired maximum budget for all expense categories of the event profile as a whole; calculate and generate a simulated user budget associated with the event profile, having a projected maximum expense amount for at least one of the plurality of expense categories corresponding to at least one trip accommodation from a list of trip accommodations and the event-identifying information; and generate, in a graphical user interface on the electronic user interface, a visual comparison of at least one simulated user budget and the personalized user budget associated with the event profile.

In accordance with yet another feature, an embodiment of the present invention includes computer-readable instructions programed to recommend at least one trip accommodation from the list of trip accommodations based on the personalized user budget and the event-identifying information associated with the event profile, the recommended trip accommodation operably configured not to exceed the personalized user budget of each of the plurality of users.

Although the invention is illustrated and described herein as embodied in a computer-implemented budget and vacation planning system and method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skills in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary, or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIGS. 3a-c depict a process flow diagram depicting a computer-implemented process of budgeting and planning a vacation in accordance with one embodiment of the present invention; and FIGS. 4-23 depict exemplary screenshots of a graphical user interface of the budgeting and vacation planning software application, in accordance with embodiments of the present invention.

DETAILED DESCRIPTION

The present invention provides a novel and efficient computer-implemented budget and vacation planning system and method carried out by multiple users over a network and, more particularly, a computer-operated system and method operated by multiple users utilizing an electronic computing device. Embodiments of the invention provide a budgeting and trip planning software application that is operably configured to enable users to budget, plan, vote on, select, and book various trip accommodations or aspects of a getaway, staycation, trip, or other vacation event. The budget and vacation planning system and method includes one centralized website or mobile application that comprises several beneficial features including an event profile, an instant messaging forum or chat, and a selectively customizable poll wherein users can initiate polls relating to various trip accommodations and vote on the same until a final collective selection is reached. Each feature of the present invention is operably configured to assist users in the decision-making process that is implicated in the planning of a trip or vacation. Said differently, each aspect of the present invention is designed with the ultimate goal of finalizing each aspect of a trip, e.g., lodging, transportation, etc., by prompting, encouraging, or otherwise facilitating final selections from all users in a travel group.

Figure 1:
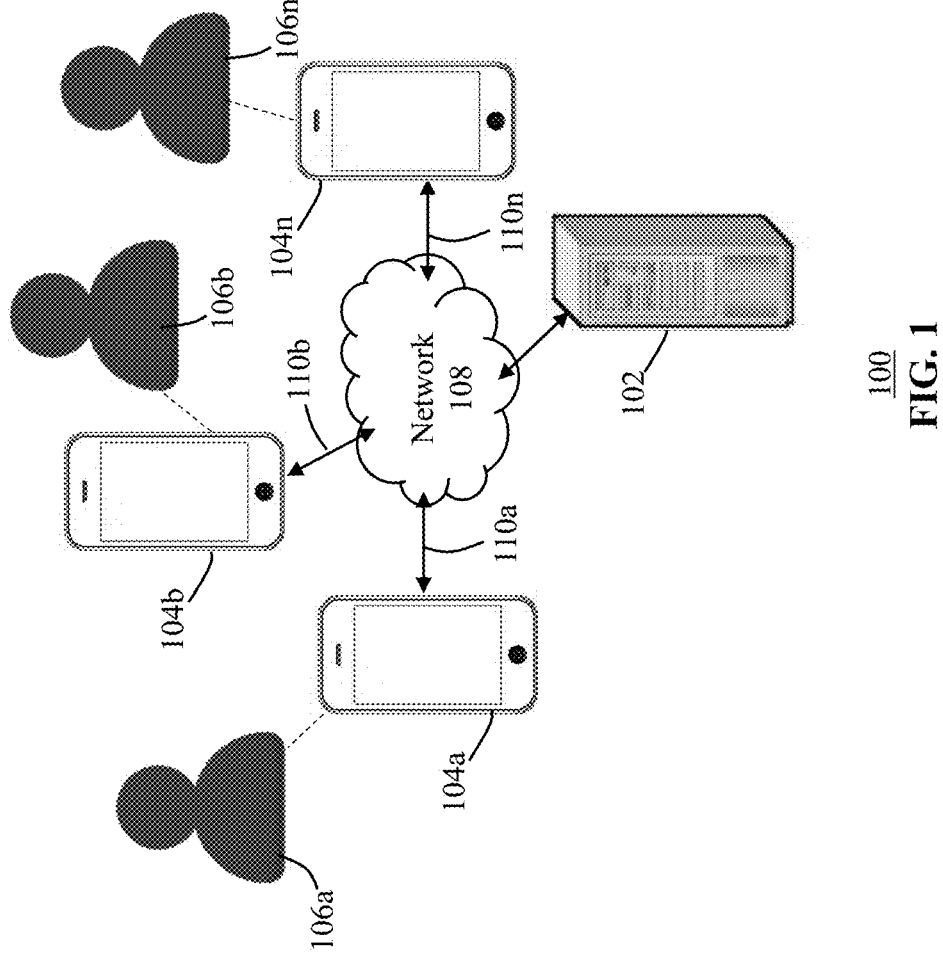
FIG. 1 is an exemplary network implementing a budgeting and vacation planning software application in accordance with one embodiment of the present invention.

Referring now to FIG. 1, one embodiment of the present invention implemented over a network 108 is shown in a schematic view. FIG. 1 along with the other figures depicted herein show several advantageous features of the present invention, but, as will be described below, the invention can be provided in several combinations of features and components, and varying numbers and functions of the components. The first example of a computer-implemented budgeting and vacation planning software application implemented over a network 108 is shown in FIG. 1. The invention requires at least two user electronic computing devices 104a-n, wherein "n" represents any number greater than one and, as described further below, enables a user to communicate with other users to budget, plan, and book a trip.

Figure 2:
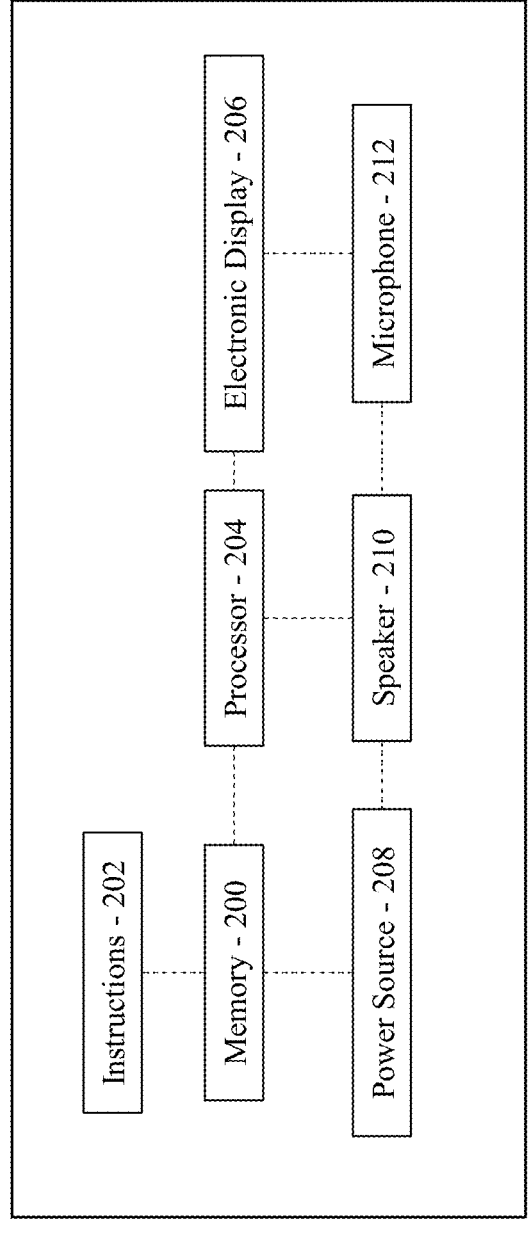
FIG. 2 is a block diagram depicting exemplary electrical components utilized in one or more of the user electronic computing devices in accordance with embodiments of the present invention.

As seen in the accompanying figures, the software application is beneficially downloadable and downloaded onto the plurality of electronic computing devices 104a-n. The downloading may occur at separate times and may originate from an administrative server 102 that may also be operable to communicatively couple the devices 104a-n over the network 108. Although the electronic computing devices 104a-n are depicted as mobile phones, they may be other computing devices, such as tablets, laptops, or computers. In one embodiment, the software application is operably configured to be downloadable and/or downloaded on a first user electronic computing device 104a, e.g., an event generating user, and a second user electronic computing device 104*b*, e.g., an event receiving user. With reference to FIG. 2, the software application includes computer-readable instructions and/or a medium 202 programmed to carry out steps implementing the present invention. As appreciated by those of skill in the art, the instructions may be stored on the devices 104*a-n* and, when executed by a computer, cause the device to perform the inventive method described herein and exemplified in FIGS. 3*a-c*.

With reference to FIG. 1, the software application, devices 104*a-n*, system, and method may be operated over the network 108 and includes connections 110*a-n*, which are the medium used to provide communication links between various devices and computing devices connected together. The connections 110*a-n* may be wired or wireless connections. A few exemplary wired connections are cable, phone line, and fiber optic. Exemplary wireless connections include radio frequency (RF) and infrared radiation (IR) transmission. Many other wired and wireless connections are known in the art and can be used with the present invention.

The network 108 may also include the Internet, which represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, the network 108 also may be implemented as a number of different types of networks, such as for example, an Intranet, a local area network (LAN), a wide area network (WAN), a cellular network. FIG. 1 is intended as an example, and not as an architectural limitation for the present invention. The network 108 may also include additional servers and other devices and entities not shown.

FIG. 2 depicts a schematic block diagram of electrical components that may be coupled to or otherwise included on the devices 104*a-n* and one or more servers 102. Some of these components includes a non-transitory memory 200 having the instructions 202 stored thereon, a processor 204 for implementing the instructions, an electronic display 206, a power source 208 (e.g., battery) providing power to the electrical components utilized in the device, and a speaker 210, microphone 212, or other transducers. Other components, however, may be utilized.

Figure 3A:
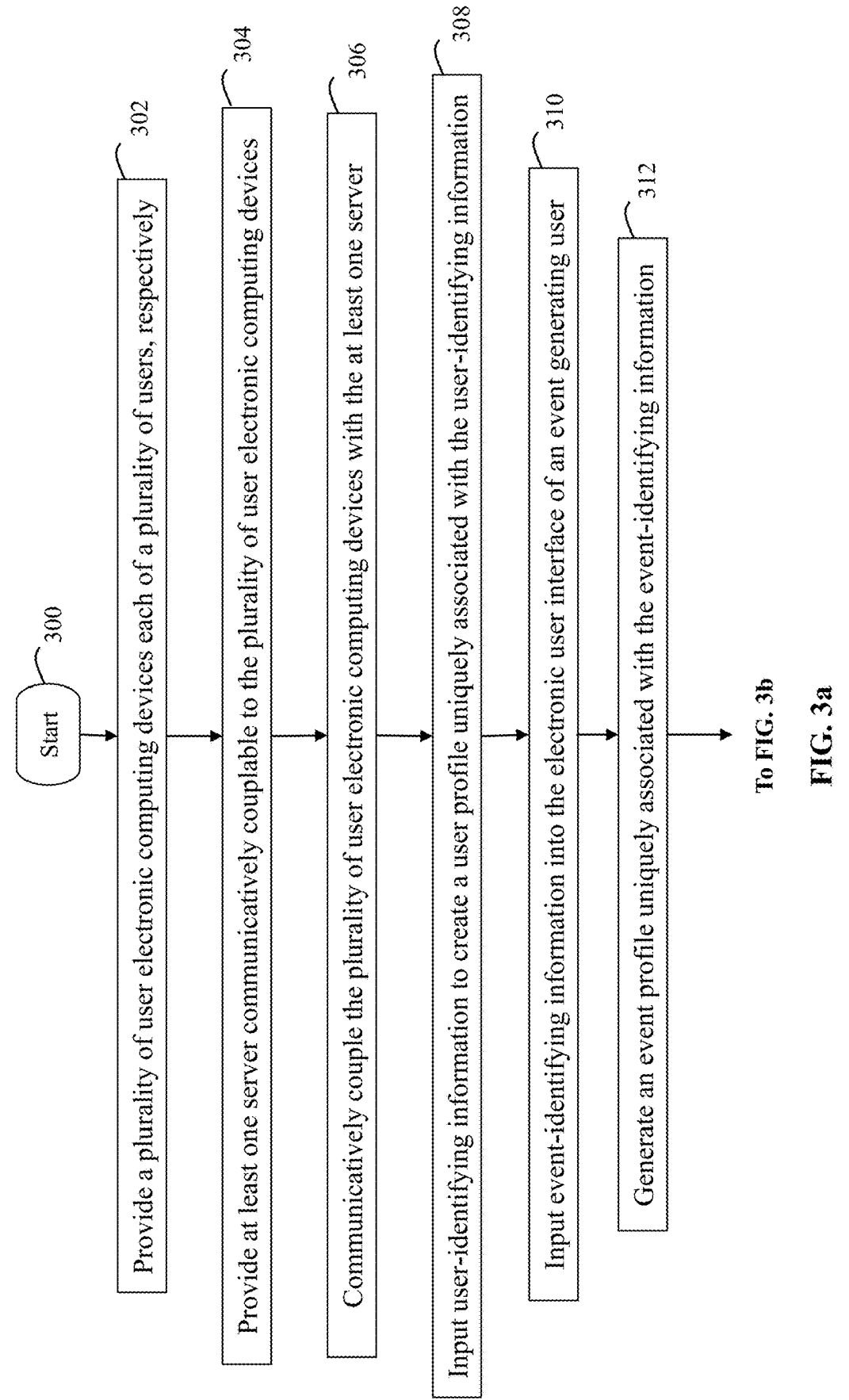
Figure 4:
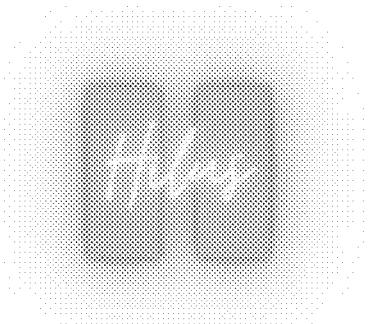
Figure 4:
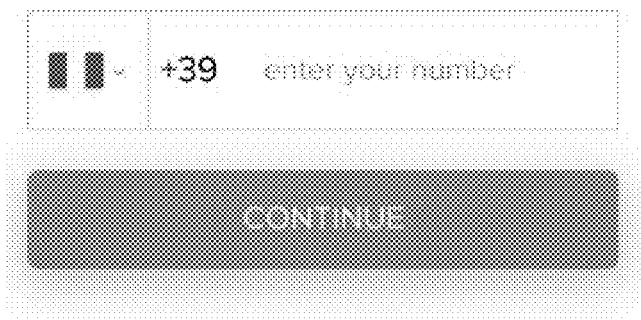
Figure 5:
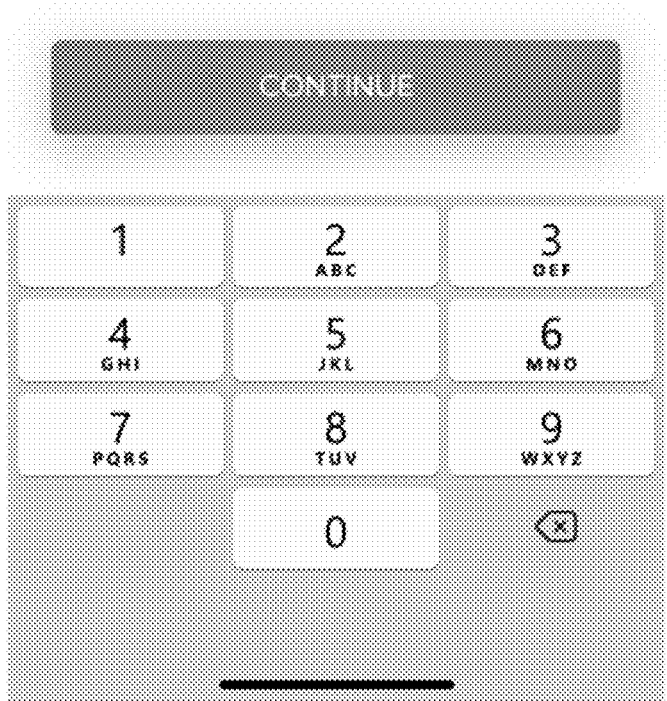
Figure 7:
Figure 7:
Figure 8:
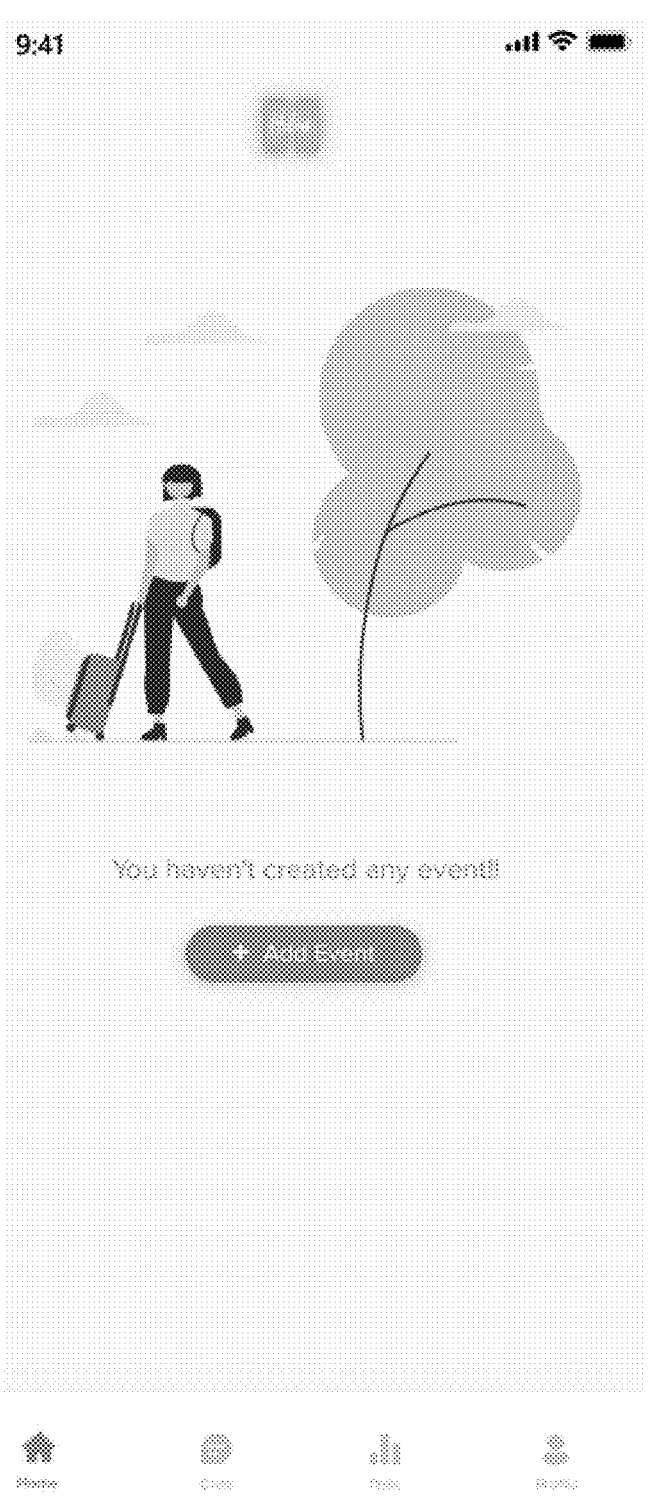

FIGS. 4-23 will now be described in conjunction with the process flow chart of FIGS. 3*a-c*. Although FIGS. 3*a-c* shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIGS. 3*a-c* for the sake of brevity. In some embodiments, some or all of the process steps are included in FIGS. 3*a-c* can be combined into a single process.

Specifically, a computer-implemented process of budgeting and planning a vacation begins at step 300 and immediately proceeds to step 302, which includes providing the plurality of user electronic computing devices 104*a-n*, each for one of the plurality of users 106*a-n*, respectively, and each having an electronic user interface. Next, step 304 comprises providing the at least one server communicatively couplable to the plurality of user electronic computing devices 104*a-n* over the network, with the at least one computer processor, and with the at least one non-transitory memory storing a plurality of user accounts thereon and each associated with one of the plurality of users 106*a-n*.

Next, the process includes step 306 of communicatively coupling the plurality of user electronic computing devices 104*a-n* with the at least one server 102. As explained in greater detail above, the plurality of user electronic computing devices 104*a-n* are communicatively coupled with the server 102 over the network 108 (e.g., the Internet) in an exemplary embodiment.

Step 308 includes inputting, by the plurality of users 106*a-n*, user-identifying information (e.g., name, phone number, username, password, etc.) into the electronic user interface of each of the plurality of user electronic computing devices 104*a-n*, respectively, to create a user profile uniquely associated with the user-identifying information. This data may be inputted manually through the user interface of the device 104*a*, through an auxiliary input, or dictated into a field by using a microphone.

A next Step 310 (depicted in FIG. 13) entails inputting event-identifying information into the electronic user interface of the user electronic computing device of an event generating user, wherein the event generating user is one of the plurality of users. The event-identifying information includes at least one of an event name, an event type, an event date, and at least one of a mode of transportation or a type of lodging. Said differently, the event-identifying information consists of the very preliminary details or information the event generating user possesses relating to a specific vacation, trip, getaway, staycation, or other such event. It is customary and expected for the event-identifying information to be quite limited and potentially subject to change. For example, the event generating user may know only the event name, e.g., Family Vacation, and type of lodging, e.g., a cruise. In this scenario, the event-identifying information would only consist of the event name and type of lodging. In accordance with a next Step 312, this event-identifying information will make up an event profile that the user can selectively view and reference at any time. The event profile is uniquely associated with the event-identifying information. In cases where the event generating user is planning or participating in a plurality of trips, e.g., a family vacation, honeymoon, girls' getaway, etc., there will be a plurality of event profiles, each one uniquely associated with the event-identifying information for that particular event. Beneficially, the user may access any of the event profiles at any time to view the details associated with that event. This feature, in turn, makes it easier and more convenient for users to simultaneously keep track of multiple events at one time.

Step 314 (best depicted in FIGS. 11-12) comprises inputting contact information associated with an event receiving user into the electronic user interface of the event generating user to create a travel group uniquely associated with the event profile, wherein the event receiving user is one of the plurality of users. Exemplary contact information includes a phone number, e-mail address, social media account name or handle, or other such information used to contact and communicate with the event receiving user. This Step enables the user to invite and connect with other users who will be attending the same trip or event as that identified in the event profile, wherein such users collectively make up the travel group. In the event of a honeymoon, for example, the event generating user may be the soon-to-be-husband/fiancé and the event receiving user may be the soon-to-be-wife/fiancée. In this example, the husband and wife make up the travel group and the husband, as the event generating user, would have to input contact information of the wife, i.e., the event receiving user, to form the travel group on the electronic user interface of the user electronic computing device.

In one embodiment, the contact information of the event receiving user may consist of a phone number and be imported directly from the phone book or contacts list resident on the user electronic computing device of the event generating user. In another embodiment, the contact information of the event receiving user may be the account name or handle that is uniquely associated with the social media account of the event receiving user, e.g., Facebook®, Instagram®, Snapchat®, etc. In either case, the event receiving user receives a notification (e.g., a text message in the former scenario or an alert, notification, or in-app message in the latter scenario) informing the event receiving user that the event receiving user is being added to the travel group. In an exemplary embodiment, the notification is framed as a prompt or invitation to join the travel group, which the event receiving user may accept, reject, or ignore. To accept, the event receiving user must download and execute a software application on the user electronic computing device and create a user profile if one does not already exist for the event receiving user, wherein the user profile contains user-identifying information of the event receiving user and is uniquely associated with the user-identifying information. Once the event receiving user has created a user profile, the event receiving user is capable of logging into the user profile uniquely associated with the user-identifying information of the event receiving user and receiving and viewing the event profile on the electronic user interface of the user electronic computing device of the event receiving user. Said differently, this Step enables the user to selectively view the event-identifying information associated with the event profile if the user has an existing user profile or prompts the user to create a user profile to view the event profile. If the event receiving user rejects or ignores the prompt/invitation, the event receiving user is unable to view the event profile or the event-identifying information associated therewith. With multiple events or trips, users can easily view and manage the applicable travel groups and add or remove event receiving users to the travel group as needed. In a preferred embodiment, the event receiving user, after accepting the prompt/invitation, may further add additional event receiving users to the travel group by inputting contact information associated with these additional users. This feature ensures that all users who need to be added to the travel group are added even where one single user, e.g., the event generating user, does not possess the contact information for all the users who need to be added to the travel group. The users within the travel group may vary and fluctuate over time as users are removed from the travel group (e.g., where, due to a scheduling conflict or medical emergency, the user can no longer attend the event) and/or added to the travel group (e.g., where the event receiving user adds other users to the travel group).

Figure 9:
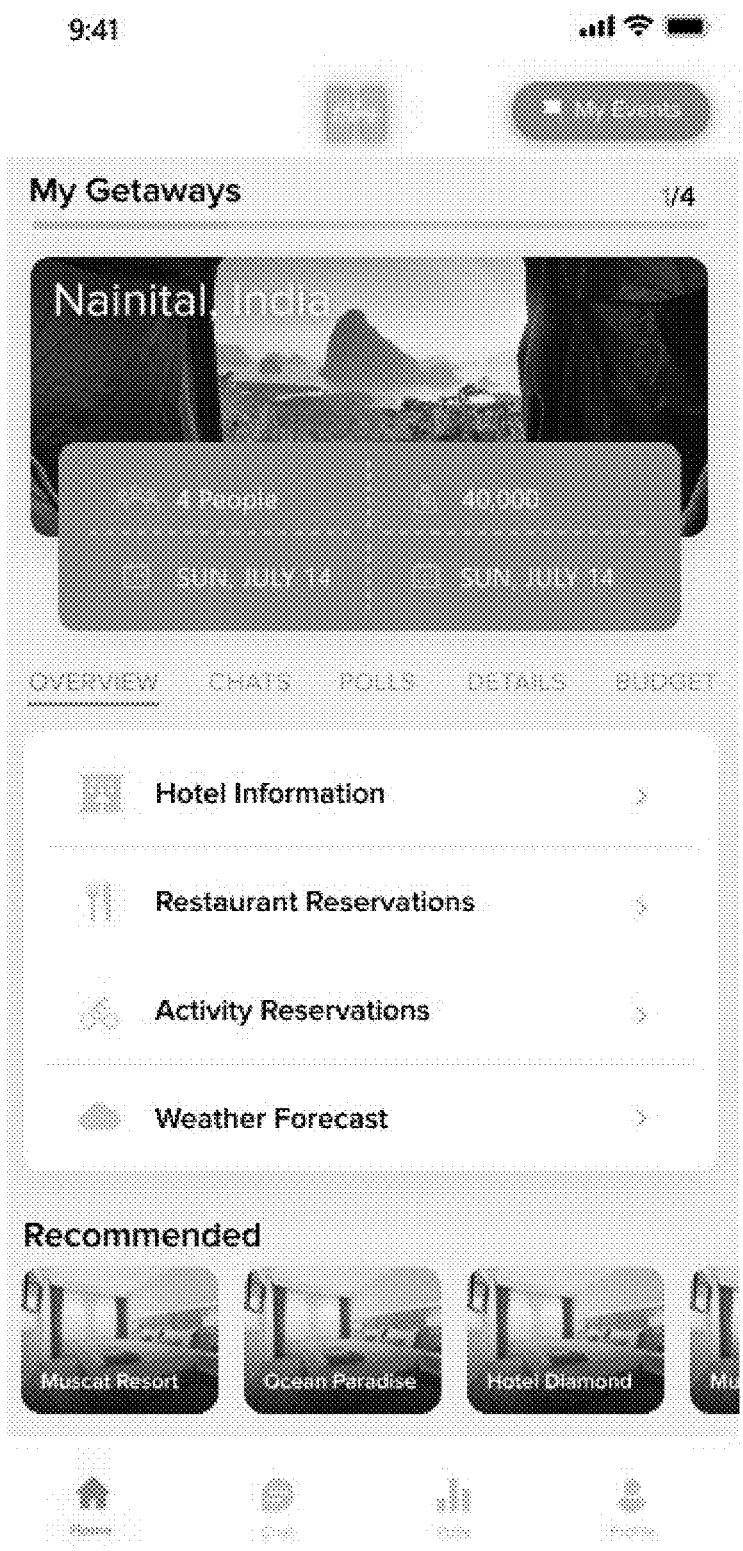
Figure 10:
Figure 11:
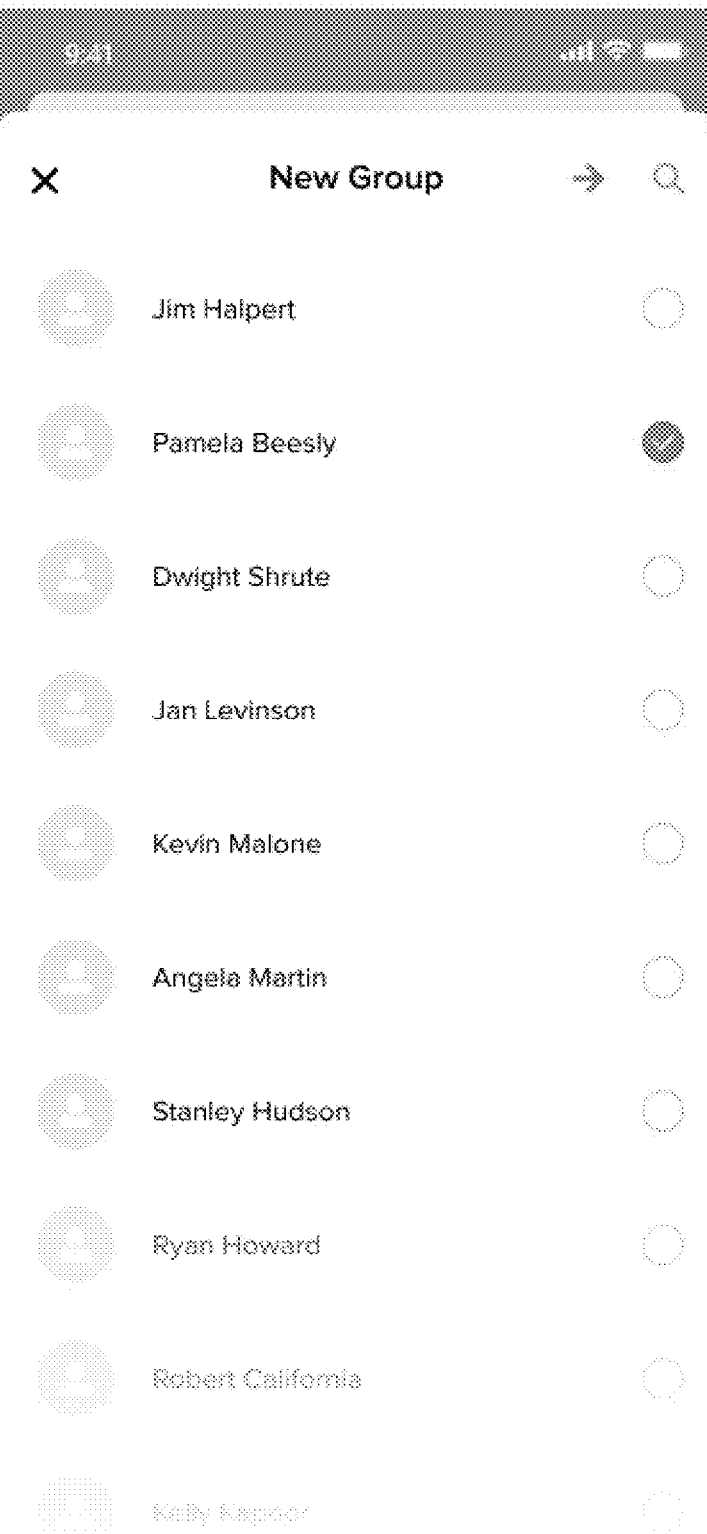
Figure 12:
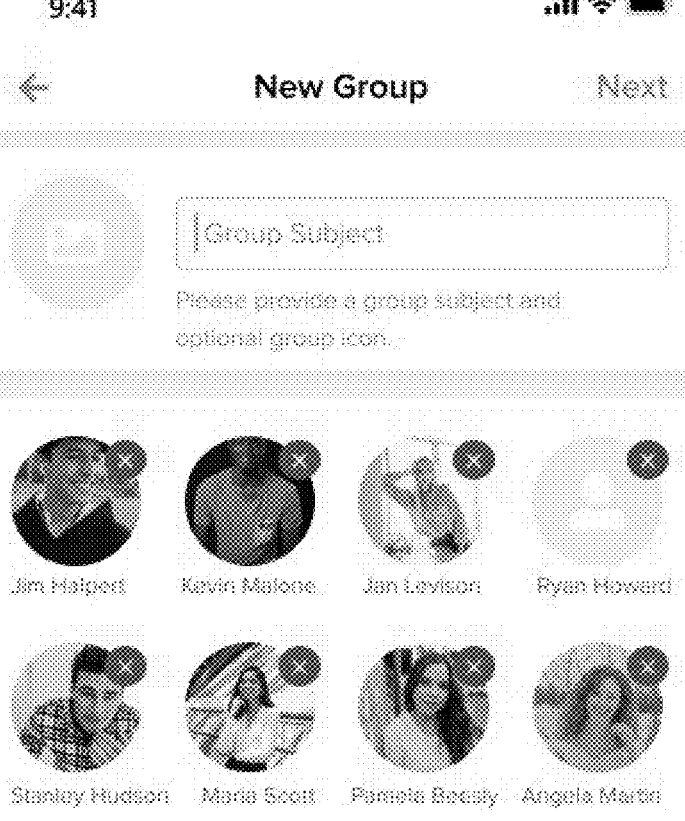
Figure 13:
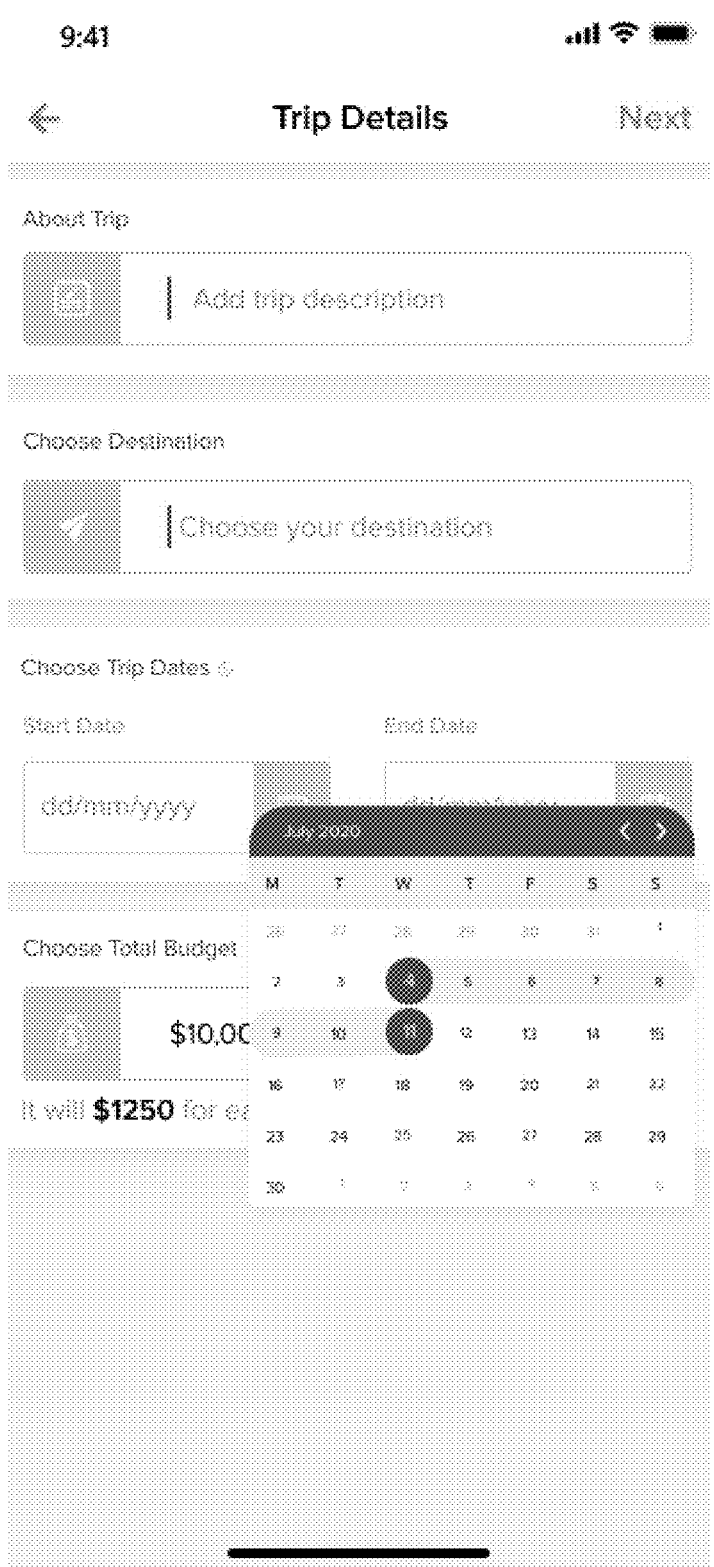
Figure 14:
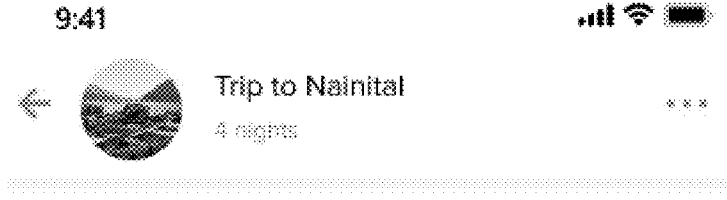
Figure 14:
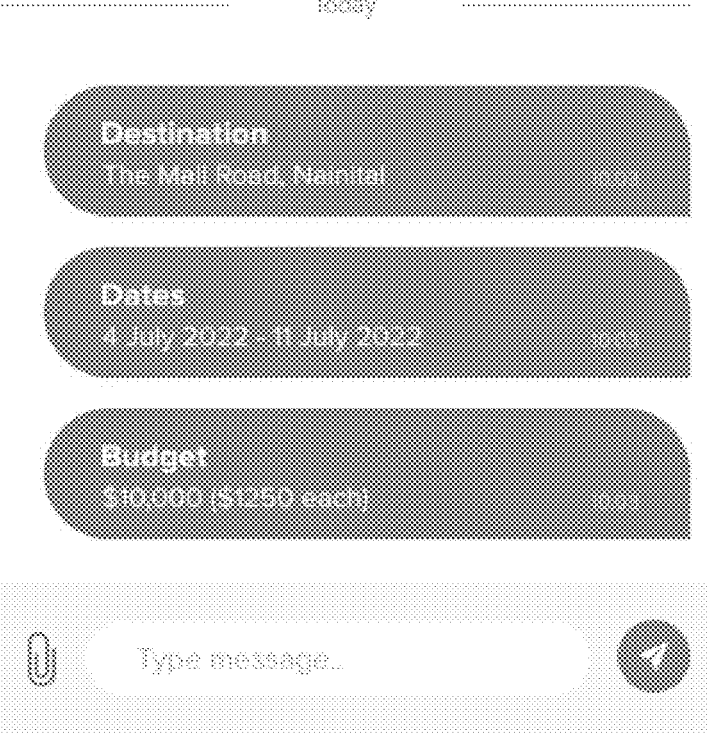
Figure 15:
Figure 16:
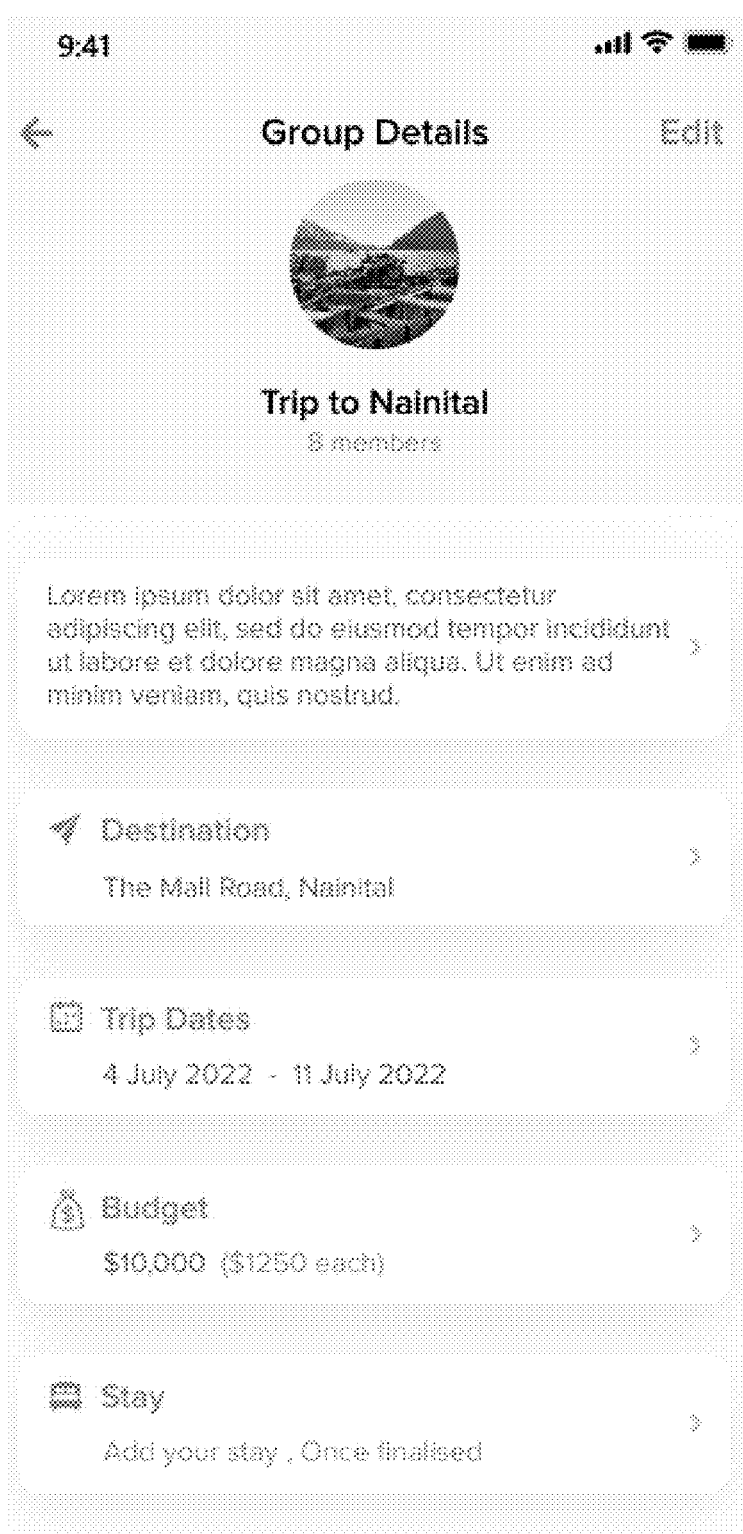
Figure 17:
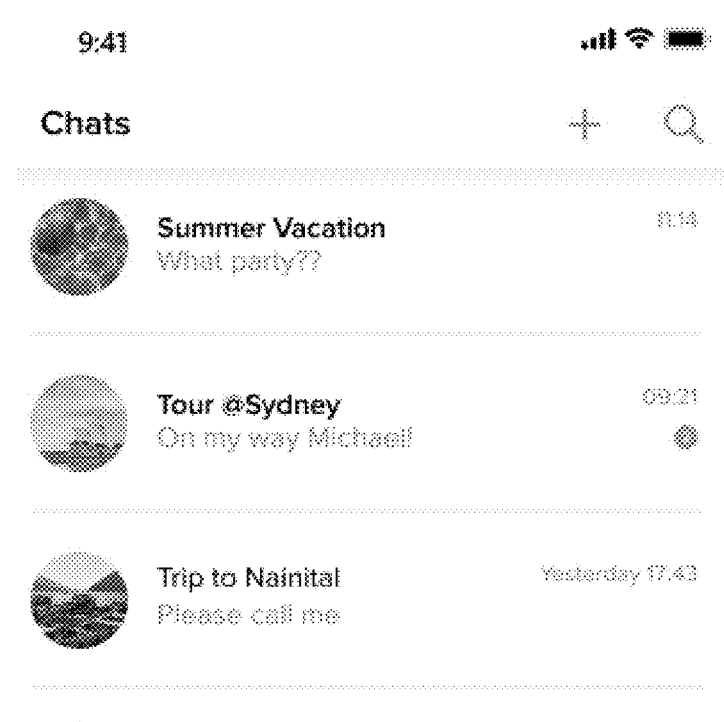
Figure 17:
Figure 18:
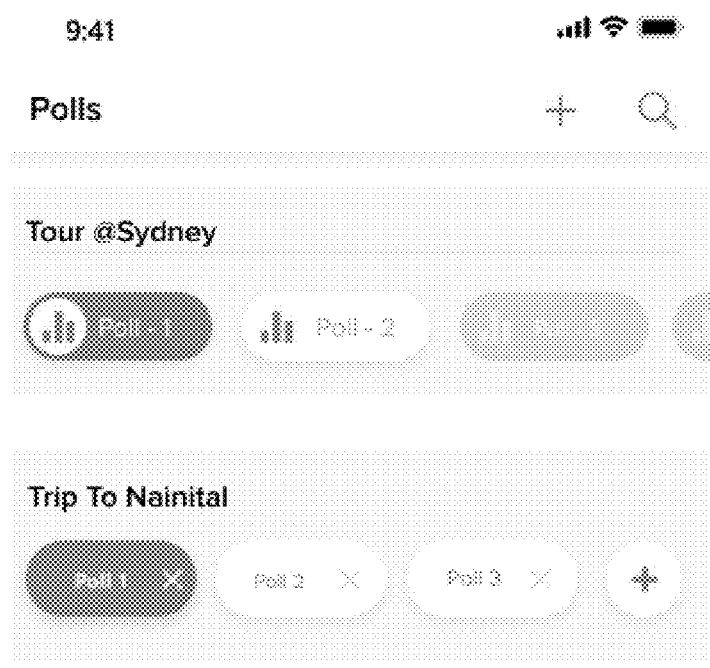
Figure 18:
Figure 19:
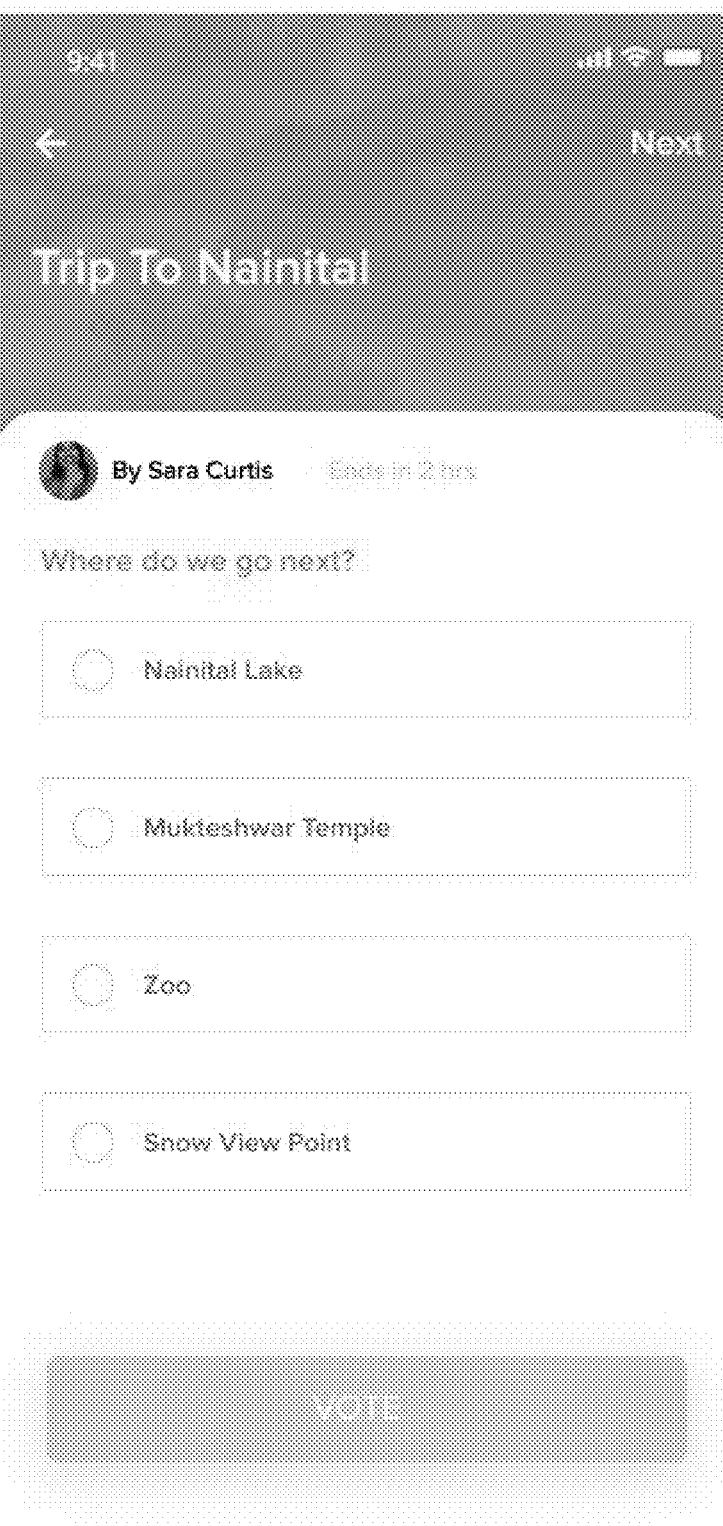
Figure 20:
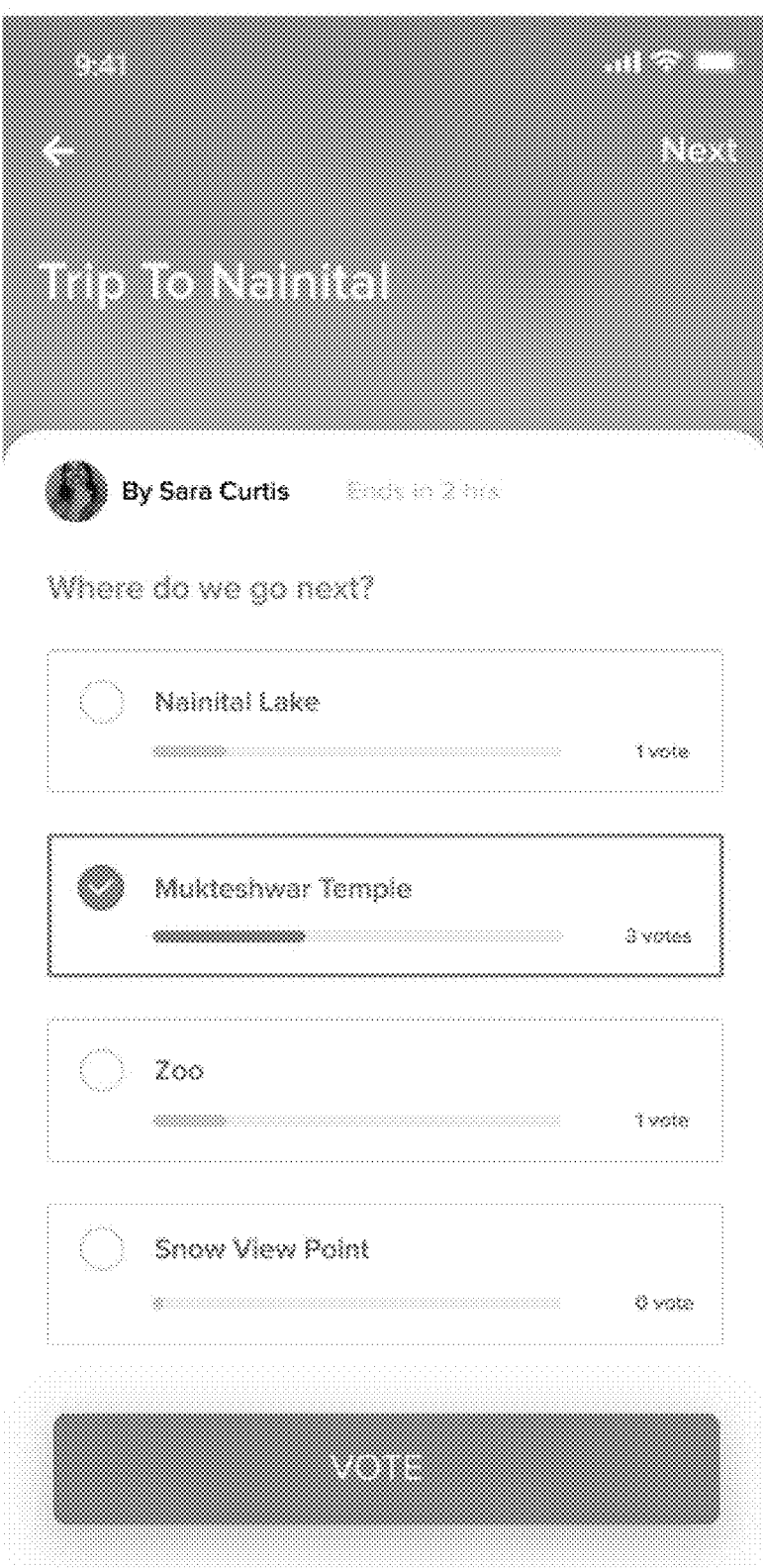
Figure 21:
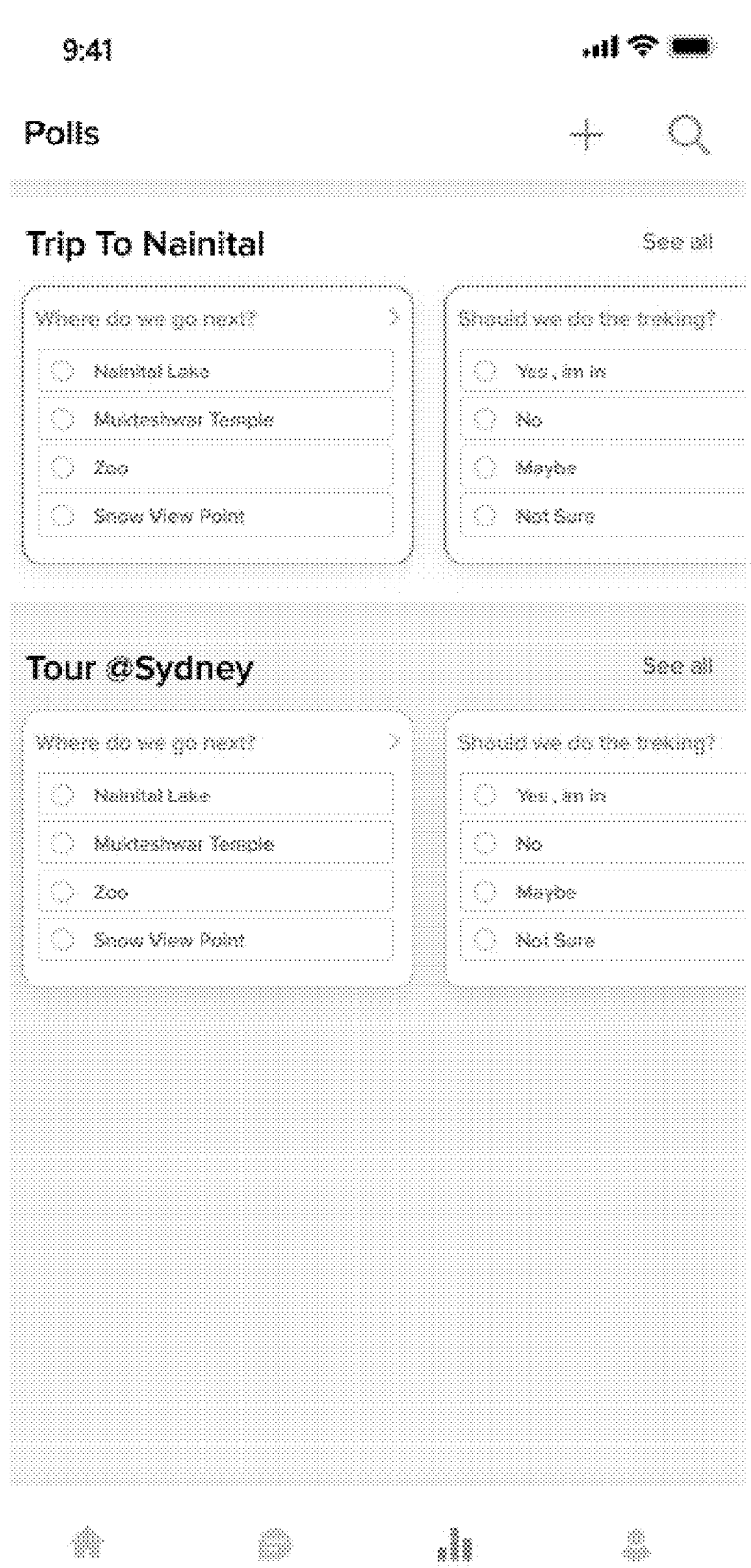
Figure 23:
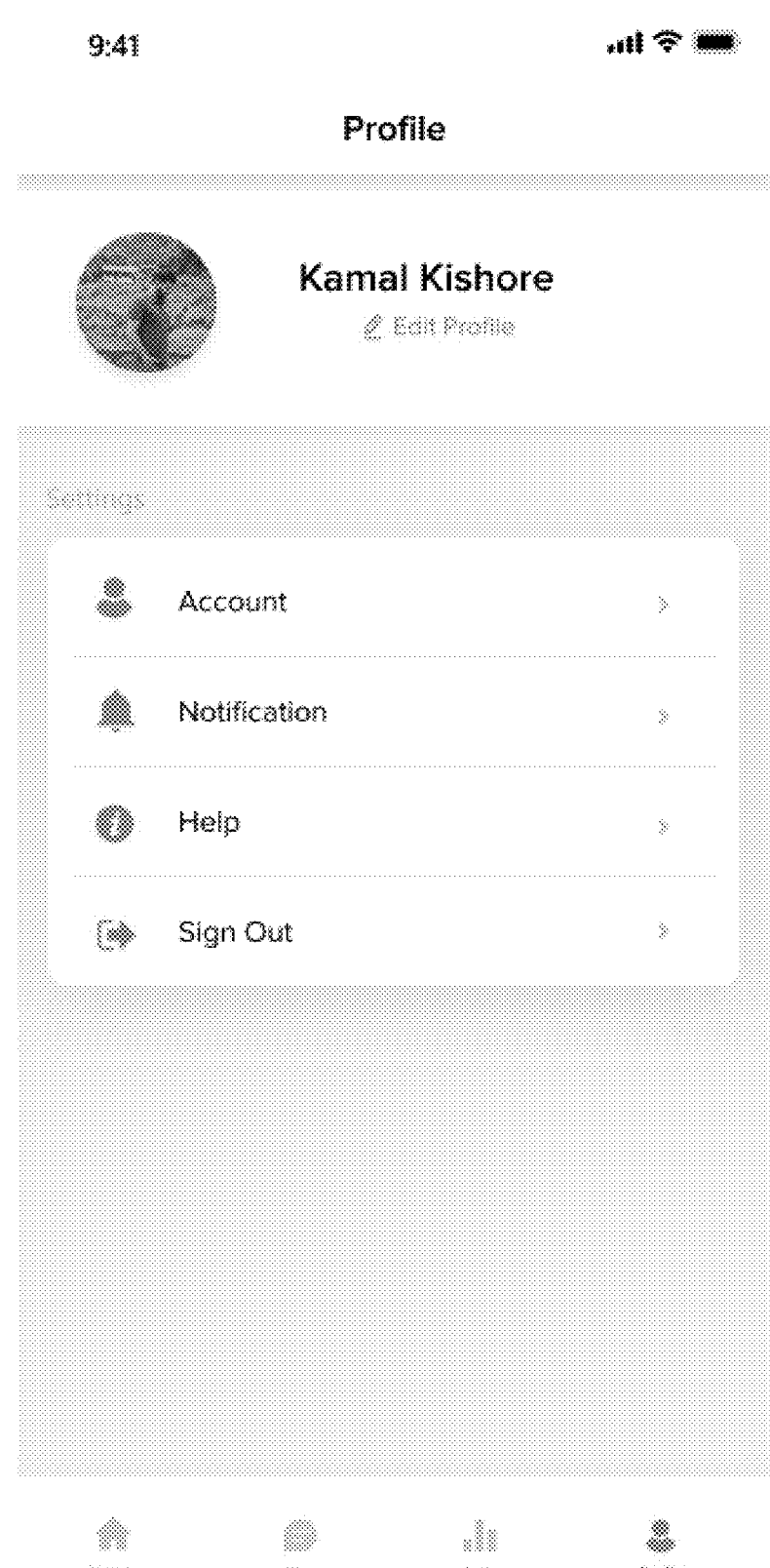

A further Step 316 entails receiving and displaying the event profile on the electronic user interface of the event receiving user. The event profile (an exemplary depiction of which is seen in FIG. 9) provides a targeted overview of the key information about the event or trip such as, by way of example and without limitation, the date(s) of the event, the type of event, the location of the event, the number of users within the travel group and the identities of said users, etc.

In accordance with a next Step 318, a travel group input forum (depicted in FIGS. 14-15) is generated on the user interfaces of the event generating user and the event receiving user, wherein the travel group input forum is uniquely associated with the event profile and is operably configured to enable the plurality of users to collectively and selectively send and receive electronic communications with one another. The travel group input forum is unique in that only those users desired to have access to the event profile (e.g., it may be password protected) are in the travel group input forum. The travel group input forum is akin to an in-app chat or instant messaging feature and enables the plurality of users within the travel group to quickly and easily communicate with one another. When viewed in the context of the purpose the instant invention is intended to serve, this feature is beneficial because it opens the lines of communication between the plurality of users in the travel group so that the users can freely discuss different issues or aspects of the trip. Some issues inevitably need a thorough explanation, reasoning, or discussion. For example, if one user is unable to fly due to a pre-existing medical condition, the user would explain this in the travel group input forum to avoid the unnecessary expenditure of time by other users with respect to the transportation aspect of the trip, e.g., this would rule out all flights and limit the transportation options of the travel group to, for example, renting a vehicle or driving one's own vehicle, taking a train, taking a ship or cruise, etc. Alternatively, the plurality of users in the travel group may choose to take several modes of transportation, e.g., some of the users may carpool, some of the users may book the same flights, etc. The travel group input forum provides the plurality of users with the forum, opportunity, and space they need to verbalize and share pertinent information about the trip with each other, which is an integral part of planning an event, trip, or vacation. In some embodiments, the travel group input forum may incorporate a silencing feature wherein the user can selectively silence notifications arriving from, or connected to, the travel group input forum (e.g., messages, reactions, etc.). This feature provides for greater convenience of use when the user is occupied with another activity, such as work, and does not wish to be interrupted by incoming notifications generated in connection with the travel group input forum.

Not all aspects of trip planning necessitate a prolonged discussion or debate. For aspects that merely implicate users' preferences, a poll is a more effective tool to use in narrowing down the travel group's final choice or selection. A further Step 320, therefore, comprises generating an event poll (depicted in FIGS. 18-22) uniquely associated with the event profile on the user interface of a poll generating user, wherein the poll generating user is one of the plurality of users and the event poll includes a query field, a response field, and a cutoff data field. The event poll essentially enables the plurality of users in the travel group to vote on any specific selection identified by the poll generating user, e.g., the type of lodging, the specific hotel, the length of the trip, etc. The question or inquiry being posed to the plurality of users is memorialized within the query field. Each event poll comprises a single query. Multiple queries, therefore, require that multiple event polls be generated. The proposed response(s) or selection(s) are reflected within the response field. In one embodiment, there is no cap or limit to the number of proposed responses that may be added to the response field. In another embodiment, the poll generating user may place a limit on how many total proposed responses the event poll may contain and, more specifically, how many proposed responses each of the other users may add. The desired length of time the plurality of users have to submit their selection is inputted in the cutoff data field. In a preferred embodiment, the cutoff data field must reflect a specifically delineated date and time (e.g., Jun. 19, 2023, at 5:00 p.m.) or duration (e.g., 24 hours, 72 hours, 7 days, etc.). The imposition of a concrete and certain deadline by when the plurality of users must have all submitted their selections (or otherwise forfeit their vote) serves an important purpose in the vacation planning process. Namely, it functions as a strong motivator for the plurality of users to timely submit their selections, particularly when compared to the alternative which is not imposing a deadline at all (in which case users would have no sense of urgency in submitting their selections and would delay doing so or even forget to do so). Rather than facilitating the planning and decision-making process, this would have the opposite effect insofar as it would encourage and allow for dilatory tactics that would significantly delay the decision-making process. It is for this reason that an exemplary embodiment of the present invention comprises a date certain deadline in the cutoff data field of the event poll. In an alternative embodiment, however, the duration the event poll remains open for the plurality of users to submit their selections may be set to none (or indefinite) by the poll generating user. In scenarios where the event is far in the future or where the plurality of users require a prolonged period of time to respond (e.g., busy schedules), it may be more prudent to not set a deadline for the event poll at all. In this way, the present invention addresses the differing needs of different users and travel groups. In some embodiments, recommended queries for the query field (e.g., what onshore excursion should we all do together as a group?), responses for the response field (e.g., scuba diving), and/or cutoff times or durations for the cutoff data field (e.g., 48 hours) may be automatically generated and displayed on the user interface of the electronic user device of the user to further assist in the decision-making process.

A next Step 322 entails initiating a poll closing timer corresponding to the poll generating user inputting query data in the query field, inputting response data in the response field, inputting cutoff data in the cutoff data field, and corresponding to the event poll communicated to the plurality of user electronic computing devices of the plurality of users in the travel group and over the network, the poll closing timer including a start time, an end time, and a polling session time separating the start time and the end time. The query field, a response field, and a cutoff data field are preferably embodied in a graphical user interface configured to be electronically and digitally manipulated by the user, e.g., by inserting alphanumeric text and punctuation. The poll closing timer tracks the amount of time remaining for the plurality of users in the travel group to submit their respective response data in the response field. The start time of the poll closing timer may begin to run either automatically upon the poll generating user inputting the query data in the query field, the response data in the response field, and the cutoff data in the cutoff data field, or it may begin to run from a pre-selected date and time specified by the poll generating user. The latter scenario may be useful where the poll generating user intends to pose multiple queries but prefers for each query to be answered independently, one at a time, as opposed to simultaneously by the plurality of users in the travel group, or where the order of the queries is significant and it would make logical sense for the queries to follow one another. For example, the first query could be "What type of transportation should we use to reach the destination?" and the second query, which would not become visible to the plurality of users in the travel group until all users have voted on the first query or forfeited their ability to do so, could be "Which flight (or rental car, train, etc.) should we take?" In a preferred embodiment, any user in the travel group can be the poll generating user, i.e., all users can initiate event polls. This feature is particularly useful in fostering collaboration between, and participation or involvement from, all users because it allows each one of them to identify a question relating to a particular aspect of the trip that other users may not have considered, thought of, or cared about. Users collectively contribute to the detailed and well-thought-out planning of the event. In another embodiment, however, the poll generating user is a single user in the travel group who functions as an administrative user that, alone, has the ability to initiate event polls. Certain trips (e.g., a work-oriented trip or a bachelor party) are more appropriately led by a single individual (e.g., a supervisor or best man). While this embodiment still allows the plurality of users to remain involved in the planning and decision-making process by responding to event polls and making their preferences, needs, requests, etc. known in the travel group input forum, it places a certain degree of planning control and direction in the hands of a single poll generating user.

In accordance with a next Step 324, a voting user either selects response data inputted by the poll generating user or inputs supplemental response data in the response field of the event poll within the polling session time to generate a user vote. The voting user is one of the plurality of users in the travel group. The user vote is communicated and stored on the at least one non-transitory memory of the at least one server and is one of a plurality of stored user votes. This Step allows the voting user's preferences to be voiced within the travel group because the voting user is not restricted to simply selecting response data inputted by the poll generating user or the other voting users within the travel group. In the event the voting user is not fond or receptive of the response data already inputted in the event poll, the voting user has the option to input supplemental response data in the response field of the event poll that better reflects the voting user's desired preference. The supplemental response data may be in various forms including, but not limited to, a written response typed in by the voting user (e.g., the name of a hotel), a hyperlink or URL link which redirects to a website containing information regarding the voting user's desired preference (e.g., the hotel website), or a link to a trip accommodation that is listed and reflected on the user interface of the electronic user device of the voting user. Specifically, one embodiment of the present invention comprises a Step of displaying a list of trip accommodations on the user interface, wherein the trip accommodations pertain to at least one of available flights, hotels, rental vehicles, short-term rental accommodations, cruises, vacation packages, excursions, or other similar accommodations. Aside from being able to selectively view each of the trip accommodations, review the information associated with the trip accommodation (e.g., description, location, amenities, price, reviews, photographs, videos, etc.), and book the trip accommodation (in a preferred embodiment) directly on or through the user interface, the voting user also has the capability of sharing the trip accommodation with users in the travel group input forum and selecting or inputting the trip accommodation as the voting user's supplemental response data and submitting the selected trip accommodation as the voting user's user vote. Said differently, the selected trip accommodation is imported from the list of trip accommodations on the user interface into the response field of the event poll by the voting user and submitted as the voting user's user vote, making it visible to the plurality of voting users. By sharing the selected trip accommodation with the travel group in the travel group input forum, the voting user can initiate a discussion or conversation relating to the trip accommodation. In the travel group input forum, the plurality of users can freely discuss, with particularity, any aspect of the trip in detail and determine whether any particular trip accommodation is a serious enough contender to be added as response data to the event poll.

A next Step 326 entails communicating the plurality of stored user votes to the user electronic computing device of the voting user and displaying the plurality of stored user votes on the user interface of the voting user after generating the user vote within the polling session time. The voting user is unable to see the user votes of the plurality of voting users (including the poll generating user) until after the voting user has submitted his/her user vote. Instead, the plurality of stored user votes are displayed on the user interface of the voting user after the voting user has submitted his/her user vote. This prevents the plurality of voting users from being disproportionately swayed or influenced for or against any particular response data upon seeing how other voting users have voted. By the time the voting user is able to see how the other voting users in the travel group have voted, the voting user has already submitted his/her user vote and is generally (with some exceptions, discussed in greater detail below) unable to change his/her original, stored user vote. In accordance with an additional feature, the plurality of stored user votes may be selectively configured to be anonymous such that none of the voting users are informed as to which voting user submitted, or corresponds to, which stored user vote. This feature beneficially eliminates the intimidation or influence that, for example, one voting user may have on another. In a preferred embodiment, the plurality of voting users who have submitted their user vote receive a push notification or other electronic notice once the stored user vote of another voting user is received, displaying the stored user vote on the user interface of the voting user. Said differently, the stored user votes are visible to those voting users who have submitted their user votes, immediately after the stored user votes are stored on the at least one non-transitory memory of the at least one server and communicated to the user electronic computing device of the voting users who have submitted their user votes. In an alternate embodiment, the plurality of stored user votes are not visible to the plurality of voting users who have submitted their user votes until the polling session time has expired and all stored user votes (including any forfeited user votes resulting from a failure to submit the user vote within the polling session time) have been submitted, stored on the at least one non-transitory memory of the at least one server, and communicated to the user electronic computing device of the voting users who have submitted their user votes.

In accordance with a next Step 328, the process entails autonomously calculating at the end time of the poll closing timer, by the at least one computer processor, a final poll selection corresponding to one of the plurality of stored user votes having a greatest frequency of selection and storing the final poll selection in the event profile. Said differently, the response data having the greatest frequency of selection, as calculated by the number of stored user votes corresponding to the particular response data, is the final poll selection. In the event there is a tie between two or more response data, the final poll selection identifies the two or more tied response data and may prompt the creation of another event poll to narrow down the two or more tied response data to a single final selection. The final selection is stored and displayed in the event profile for ease of convenience and reference to the travel group. The plurality of users in the travel group can selectively access and view the event profile at any time.

A further Step 330 comprises inputting, by each of the plurality of users in the travel group and in the user interface, a personalized user budget associated with the event profile. The personalized user budget comprises a user-generated maximum expense amount corresponding to a desired maximum budget for each of a plurality of expense categories of the event profile, and a user-generated maximum total amount corresponding to a desired maximum budget for all expense categories of the event profile as a whole. Each of the plurality of users can modulate and set their own personalized user budget for the trip or event. This feature is beneficial insofar as each user within the travel group typically has their own financial or monetary parameters that they must remain cognizant of. In other words, the budget for an event, trip, or vacation is typically user-specific as opposed to group-specific because each user within the group has different needs, preferences, desires, etc. For example, while the travel group may collectively decide to stay in a single, specific hotel, one user may opt to stay in a standard room, a second user may choose a suite, and yet a third user may select the presidential or royal suite. As such, the budget of each of the users will be personalized and greatly differ. Said personalized budget is two-fold. The first is the desired maximum budget for each of the plurality of expense categories of the event profile (e.g., lodging, transportation, activities, etc.), which provides a more detailed breakdown seeing as the user may wish to splurge in one category (e.g., lodging) but be more financially conservative in another (e.g., flight). A first user, for example, may wish to spend more on the transportation category in order to fly first class (but stay in a standard hotel room) whereas a second user may wish to do the opposite (i.e., fly economy class but stay in an upgraded hotel suite). Although the total budget for all expense categories of the event combined may be the same for both of the users, their desired maximum budget for each of the plurality of expense categories will differ. In this way, each user can better personalize both their overall budget for the trip, wherein all expense categories are combined, and their budget for each of the plurality of expense categories. The second part of the personalized user budget is the desired maximum budget for all expense categories of the event profile as a whole.

In an exemplary embodiment of the present invention, the process further comprises recommending at least one trip accommodation (i.e., a specific hotel, rental home, flight, activity or offshore excursion, etc.) from the list of trip accommodations on the user interface to the plurality of users in the travel group, the recommended trip accommodation operably configured not to exceed at least one of the user-generated maximum expense amount or the user-generated maximum total amount of each of the plurality of users. The recommendation is determined and generated using a proprietary algorithm based on the user-generated maximum expense amount (corresponding to a specific expense category), the user-generated maximum total amount (corresponding to all the expense categories combined as a whole), or both. Beneficially, the present invention saves the user time and effort spent manually reviewing and researching the various trip accommodations by recommending at least one trip accommodation that fits within the confines of the user's budget, specifically, the user-generated maximum expense amount, the user-generated maximum total amount, or both. In one embodiment, the user may select which factor the recommendation may be premised on (the user-generated maximum expense amount, the user-generated maximum total amount, or both).

In furtherance of the overall goal of streamlining the vacation- or trip-planning process and facilitating the selection and confirmation of all aspects of the trip (including the trip accommodations), a further Step includes selecting and booking at least one trip accommodation from the list of trip accommodations in connection with the event profile. Instead of having to separately book the trip accommodation from a different platform (e.g., a separate or third-party website, mobile application, travel agent service, etc.) the process is streamlined in one location because the user can book the trip accommodation directly through the application, saving considerable time and expense and providing for enhanced convenience of use. In this way, the user is also less likely to change their mind regarding the trip or cancel the trip thereafter because the user will already be financially invested in the trip.

Another feature of the present invention is a next Step of generating, in a graphical user interface on the electronic user interface, a countdown meter displaying the time remaining in the polling session time until the end time. The plurality of voting users can readily view and ascertain how much time they have remaining to submit their selections, i.e., their response data, in the event poll. Because users who fail to submit their user votes within the polling session time forfeit or lose their user vote, the countdown meter beneficially helps the plurality of voting users track how much time they have remaining to submit their user votes and to use their time accordingly to not forfeit their user votes.

Similarly, a further Step entails generating, in a graphical user interface on the electronic user interface, a voter meter identifying the plurality of users in the travel group who have not submitted a user vote. Accordingly, the plurality of users can readily view and ascertain how many (and/or which) users have not yet submitted their user votes. This capability encourages users to prompt those users who have not submitted their user votes to do so before the polling session time expires which, in turn, facilitates a more accurate and complete calculation of the travel group's preferences regarding the query posed in the query field of the event poll. In some embodiments, the voter meter also identifies how many (and/or which) users have already submitted their user votes.

As discussed supra, another Step comprises selecting and inputting, by each of the plurality of voting users in the travel group and in the user interface, at least one trip accommodation from the list of trip accommodations as supplemental response data in the response field of the event poll within the polling session time. Rather than writing in the supplemental response data or copy and pasting a URL link to a third-party website (which will inevitably open up another window or mobile application, e.g., Safari, forcing the user to toggle between several opened windows or apps), the user can simply select at least one trip accommodation from the list of trip accommodations and import the selected trip accommodation into the response field of the event poll as supplemental response data. This supplemental response data may appear as a small window featuring an overview or summary of the highlights of the selected trip accommodation (including, for example, the name, location, and price of the selected trip accommodation). The voting users, upon clicking on the supplemental response data, are then redirected to the more detailed listing for the selected trip accommodation within the application, in the event they need or want additional information relating to the trip accommodation (e.g., photos, reviews, amenities, etc.). Beneficially, users are kept within the application, obviating the need to juggle or toggle between several opened windows or applications.

A further feature of the present invention entails notifying the plurality of voting users within the travel group who have submitted their user vote to the event poll that a user vote comprising supplemental response data has been generated; and prompting the plurality of voting users within the travel group who have submitted their user vote to the event poll to confirm their user vote or to modify their user vote to the supplemental response data generated. Because each user has the ability to input supplemental response data, it is entirely possible that the first voting user, for example, may only have two available selections in the response data whereas the fourth or fifth voting user may have six available selections in the response data to choose from. In other words, the first voting user who votes early on in the polling session time cannot see the response data inputted by subsequent voting users because the users have not yet submitted their user votes. If the subsequent voting users input supplemental response data after the first voting user has submitted his/her user vote, the first voting user is deprived of the opportunity of selecting the supplemental response data because the first voting user already submitted his/her user vote. For this reason, the plurality of voting users within the travel group who have already submitted their user vote to the event poll are notified (e.g., through a push notification) once a user vote comprising supplemental response data has been generated within the polling session time, and are allowed the opportunity to either confirm their original, stored user vote or change their stored user vote to the supplemental response data that is generated. Notably, the plurality of voting users within the travel group who have already submitted their user vote to the event poll can only change their stored user vote to supplemental response data that was inputted after their stored user votes were submitted so as not to allow them to change their user vote to a response that was previously available to them during their original deliberation and vote. Each user should have the opportunity to submit their user vote based on an educated consideration of all available response data, but not the opportunity to re-do a vote based on choices (i.e., response data) that was already previously available to, and considered by, them. In an alternate embodiment, however, the plurality of voting users may change or modify their stored user vote at any time prior to the expiration of the polling session time.

A next Step consists of calculating and generating a simulated user budget associated with the event profile, having a projected maximum expense amount for at least one of the plurality of expense categories corresponding to the at least one trip accommodation from the list of trip accommodations and the event-identifying information. The at least one trip accommodation may be either selected by the user or recommended by the proprietary algorithm. This Step uses the at least one trip accommodation and the event-identifying information as a base to project what the maximum expense amount of the user will be, i.e., what the maximum budget for that particular expense category will be. The at least one trip accommodation typically provides the price (per night, for example) and the event-identifying information provides other relevant details needed to calculate the simulated user budget. For example, if the expense category is lodging, the price per night for the selected trip accommodation is $200++, and the number of nights in the trip is 2 nights (as identified in the event profile), then the simulated user budget would be approximately $400++. This allows the user to know what he/she can reasonably expect to pay if the user books the selected trip accommodation, understand what the simulated user budget would be, and then make a decision as to whether to proceed and book the selected trip accommodation (if the user is agreeable to the simulated user budget) or to select a different trip accommodation (if the simulated user budget is too high or expensive, for example). In other words, the plurality of users can make more financially sound or reasonable decisions, prior to committing to the trip accommodation, based on their personal financial constraints or lack thereof. In this way, this feature helps users plan and ultimately decide on various aspects of their trip.

Another Step comprises generating, in a graphical user interface on the electronic user interface, a visual comparison of a plurality of simulated user budgets associated with the event profile, each simulated user budget having the projected maximum expense amount for at least one of the plurality of expense categories corresponding to the at least one trip accommodation from the list of trip accommodations or the event-identifying information. The visual comparison may be, for example, a side-by-side chart, bar graph, line graph, etc. In essence, the user can visually perceive and compare more than one simulated user budget, each associated with a different trip accommodation, to narrow down the trip accommodations to the user's ultimate and final selection. In the lodging category, for example, the user may select 3 different hotels, each having a different rate per night and, by extension, a different simulated user budget associated with each hotel (i.e., trip accommodation). Using the visual comparison, the user can then see what the differences in the overall budget for the lodging expense category would be (i.e., what the user can reasonably expect to pay for that expense category) and decide which one of the three he/she would like to book.

Likewise, another Step entails generating, in a graphical user interface on the electronic user interface, a visual comparison of the simulated user budget and the personalized user budget associated with the event profile. In addition to comparing a plurality of simulated user budgets associated with a plurality of trip accommodations, the user can also compare the simulated user budget (for example, the one selected from the three choices in the foregoing example) to, and with, the personalized user budget, i.e., the user-generated maximum expense amount, the user-generated maximum total amount, or both. By seeing how the user's budget (be it for a specific expense category or for the overall trip/event, with all expense categories combined) compares to the simulated user budget, the user can make a more educated decision not only on the trip accommodation corresponding to the simulated user budget but also on the user's selection of additional trip accommodations and on any potential modifications that must be made to the personalized user budget. If there is a significant gap or disparity between the simulated user budget and the personalized user budget, the user may wish to reconsider the user's budget or selection of trip accommodations.

In a second exemplary embodiment of the present invention, the computer-implemented process includes executing a software application on each of the plurality of user electronic computing devices 104a-n, wherein the software application generates a graphical user interface on the electronic user interface, and comprising computer-readable instructions programed to receive, by the plurality of users, user-identifying information of each of the plurality of user electronic computing devices, to create a user profile uniquely associated with the user-identifying information; to receive, by an event generating user, event-identifying information generating an event profile uniquely associated with the event-identifying information and contact information associated with an event receiving user into the electronic user interface of the event generating user to create a travel group uniquely associated with the event profile, wherein the event receiving user is one of the plurality of users; to receive and display the event profile on the electronic user interface of the event receiving user; to generate a travel group input forum on the user interfaces of the event generating user and the event receiving user that is uniquely associated with the event profile, the travel group input forum operably configured to enable the plurality of users to collectively and selectively send and receive electronic communications with one another; to generate an event poll uniquely associated with the event profile on the user interface of a poll generating user, wherein the poll generating user is one of the plurality of users and the event poll includes a query field, a response field, and a cutoff data field; initiate a poll closing timer corresponding to the poll generating user inputting query data in the query field, inputting response data in the response field, inputting cutoff data in the cutoff data field, and corresponding to the event poll communicated to the plurality of user electronic computing devices of the plurality of users in the travel group and over the network, the poll closing timer including a start time, an end time, and a polling session time separating the start time and the end time; to receive, by the plurality of users, a user vote comprising at least one of the response data inputted by the poll generating user or supplemental response data inputted by a voting user within the polling session time; to communicate and store the user vote on the at least one non-transitory memory of the at least one server, wherein the voting user is one of the plurality of users in the travel group and the user vote is one of a plurality of stored user votes; to communicate the plurality of stored user votes to the user electronic computing device of the voting user and display the plurality of stored user votes on the user interface of the voting user after generating the user vote within the polling session time; to autonomously calculate at the end time of the poll closing timer, by the at least one computer processor, a final poll selection corresponding to one of the plurality of stored user votes having a greatest frequency of selection and store the final poll selection in the event profile; and to receive, by each of the plurality of users in the travel group and in the user interface, a personalized user budget associated with the event profile and having a user-generated maximum expense amount, corresponding to a desired maximum budget for each of a plurality of expense categories of the event profile; and a user-generated maximum total amount corresponding to a desired maximum budget for all expense categories of the event profile as a whole. Said differently, the computer-implemented process is embodied in a software application that is downloadable by a user. In accordance with a further feature, the computer-readable instructions may also be programmed to book at least one trip accommodation from a list of trip accommodations on the user interface in connection with the event profile. In other words, the user can directly book (wherein "book" may include making/confirming a reservation, tendering a deposit, and/or tendering the full price) the trip accommodation through the application, without having to open or access a separate browser window, tab, or application. Beneficially, the trip planning and booking process is significantly streamlined and centered in one single location. The software application may also comprise computer-readable instructions programmed to notify the plurality of voting users within the travel group who have submitted their user vote to the event poll that a user vote comprising supplemental response data has been generated, and to enable the plurality of voting users within the travel group who have submitted their user vote to the event poll to modify their user vote to the supplemental response data generated. As discussed in greater detail supra, this provides the user with a way to change the user's stored user vote within the polling session time.

In a third exemplary embodiment, the executable budgeting and vacation planning software application is resident on at least one user electronic computing device 104*a-n*.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above-described features.

What is claimed is:

1. A computer-implemented process of budgeting and planning a vacation comprising the steps of: providing a plurality of user electronic computing devices each having an electronic user interface, each associated with one of a plurality of users and each having an electronic user interface; providing at least one server communicatively couplable to the plurality of user electronic computing devices over a network, with at least one computer processor, and with at least one non-transitory memory storing a plurality of user accounts thereon; communicatively coupling the plurality of user electronic computing devices with the at least one server;

inputting event-identifying information into the electronic user interface of an event generating user, wherein the event generating user is one of the plurality of users;

generating an event profile associated with the event-identifying information; creating a travel group associated with the event profile and that includes the plurality of users;

generating an event poll that is part of a plurality of event polls each associated with the event profile and the event poll includes at least one of a query field, a response field, and a cutoff data field; inputting, by each of the plurality of users in the travel group and in the user interface, a personalized user budget associated with the event profile and having: a user-generated maximum expense amount corresponding to a desired maximum budget for each of a plurality of expense categories of the event profile; and a user-generated maximum total amount corresponding to a desired maximum budget for all expense categories of the event profile as a whole; and utilizing a programmed algorithm to recommend at least one trip accommodation associated with at least one of the query field and the response field in one of the plurality of event polls that is displayed on the user interface to the plurality of users in the travel group and that is function of the trip accommodation not exceeding at least one of the user-generated maximum expense amount or the user-generated maximum total amount.

2. The computer-implemented process according to claim 1, further comprising: displaying a recommended list of trip accommodations on the user interface based on the programmed algorithm.

3. The computer-implemented process according to claim 2, further comprising: selecting and booking at least one trip accommodation from the list of trip accommodations in connection with the event profile.

4. The computer-implemented process according to claim 1, further comprising: generating, in a graphical user interface on the electronic user interface, a countdown meter displaying the time remaining in the polling session time until the end time.

5. The computer-implemented process according to claim 1, further comprising: generating, in a graphical user interface on the electronic user interface, a voter meter identifying the plurality of users in the travel group who have not submitted a user vote.

6. The computer-implemented process according to claim 2, further comprising: selecting and inputting, by each of the plurality of voting users in the travel group and in the user interface, at least one trip accommodation from the list of trip accommodations as supplemental response data in the response field of the event poll within the polling session time.

7. The computer-implemented process according to claim 1, further comprising: notifying the plurality of voting users within the travel group who have submitted their user vote to the event poll that a user vote comprising supplemental response data has been generated; and prompting the plurality of voting users within the travel group who have submitted their user vote to the event poll to confirm their user vote or to modify their user vote to the supplemental response data generated.

8. The computer-implemented process according to claim 1, further comprising: calculating and generating a simulated user budget associated with the event profile, having a projected maximum expense amount for at least one of the plurality of expense categories corresponding to the at least one trip accommodation from the list of trip accommodations and the event-identifying information.

9. The computer-implemented process according to claim 8, further comprising: generating, in a graphical user interface on the electronic user interface, a visual comparison of a plurality of simulated user budgets associated with the event profile, each simulated user budget having the projected maximum expense amount for at least one of the plurality of expense categories corresponding to the at least one trip accommodation from the list of trip accommodations or the event-identifying information.

10. The computer-implemented process according to claim 8, further comprising: generating, in a graphical user interface on the electronic user interface, a visual comparison of the simulated user budget and the personalized user budget associated with the event profile.

11. The computer-implemented process according to claim 1, further comprising: inputting contact information associated with an event receiving user into the electronic user interface of the event generating user to create the travel group that is uniquely associated with the event profile, wherein the event receiving user is one of the plurality of users.

12. The computer-implemented process according to claim 11, further comprising: generating a travel group input forum on the user interfaces of the event generating user and the event receiving user that is uniquely associated with the event profile, the travel group input forum operably configured to enable the plurality of users to collectively and selectively send and receive electronic communications with one another.

13. The computer-implemented process according to claim 1, further comprising: generating the event poll on the user interface of an electronic computing device of a poll generating user, wherein the poll generating user is one of the plurality of users and the plurality of event polls are uniquely associated with the event profile.

14. The computer-implemented process according to claim 1, further comprising: initiating a poll closing timer corresponding to the poll generating user inputting query data in the query field, inputting response data in the response field, inputting cutoff data in the cutoff data field, and corresponding to each of the respective plurality of event polls electronically communicated to the plurality of user electronic computing devices of the plurality of users in the travel group for electronic and digital manipulation by the plurality of users and over the network, the poll closing timer including a start time, an end time, and a polling session time separating the start time and the end time; either electronically and digitally selecting response data inputted by the poll generating user or electronically and digitally inputting supplemental response data in the response field of the event poll by a voting user within the polling session time to generate a user vote and communicating the user vote from the user electronic computing device to the at least one non-transitory memory and storing the user vote on the at least one non-transitory memory of the at least one server, wherein the voting user is one of the plurality of users in the travel group and the user vote is one of a plurality of stored user votes; communicating the plurality of stored user votes to the user electronic computing device of the voting user and displaying the plurality of stored user votes on the user interface of the voting user after generating the user vote within the polling session time; autonomously calculating at the end time of the poll closing timer, by the at least one computer processor of the at least one server, a final poll selection corresponding to one of the plurality of stored user votes having a greatest frequency of selection and storing the final poll selection in the event profile; and following the end of the poll closing timer for the event poll, electronically communicating another of the plurality of event polls to the plurality of user electronic computing devices of the plurality of users in the travel group for electronical and digital manipulation by the plurality of users and over the network.

* * * * *